United States Patent
Harada

(10) Patent No.: US 7,658,979 B2
(45) Date of Patent: Feb. 9, 2010

(54) LIQUID CRYSTAL ALIGNMENT FILM COMPOSITION, LIQUID CRYSTAL DEVICE AND DISPLAY APPARATUS

(75) Inventor: Shigeyuki Harada, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 12/049,828

(22) Filed: Mar. 17, 2008

(65) Prior Publication Data

US 2008/0231785 A1 Sep. 25, 2008

(30) Foreign Application Priority Data

Mar. 19, 2007 (JP) ............... 2007-069936
Jan. 22, 2008 (JP) ............... 2008-011172

(51) Int. Cl.
C09K 19/32 (2006.01)
C09K 19/54 (2006.01)
C09K 19/56 (2006.01)
G02F 1/1337 (2006.01)

(52) U.S. Cl. ............... 428/1.2; 428/1.23; 349/123; 252/299.4; 252/299.5; 252/299.62

(58) Field of Classification Search ........... 252/299.4, 252/299, 299.625; 428/1.2, 1.23; 349/123
See application file for complete search history.

(56) References Cited

U.S. PATENT DOCUMENTS

| 6,159,562 | A | 12/2000 | Kanbe et al. | |
|---|---|---|---|---|
| 6,693,621 | B1 | 2/2004 | Hayakawa et al. | |
| 6,816,146 | B2 | 11/2004 | Harada et al. | |
| 6,913,709 | B2 | 7/2005 | Harada et al. | |
| 2005/0179004 | A1 | 8/2005 | Morishima et al. | |
| 2008/0194441 | A1* | 8/2008 | Kawata et al. | 508/208 |
| 2008/0305280 | A1* | 12/2008 | Harada et al. | 428/1.2 |

FOREIGN PATENT DOCUMENTS

JP 2001-100209 4/2001

(Continued)

OTHER PUBLICATIONS

Jun. 16, 2008 search report in connection with a counterpart European patent application No. 08 102 725.

*Primary Examiner*—Shean C Wu
(74) *Attorney, Agent, or Firm*—Cooper & Dunham, LLP

(57) ABSTRACT

To provide a liquid crystal alignment film composition including at least one type of triphenylene compound (I) represented by the following general formula (1):

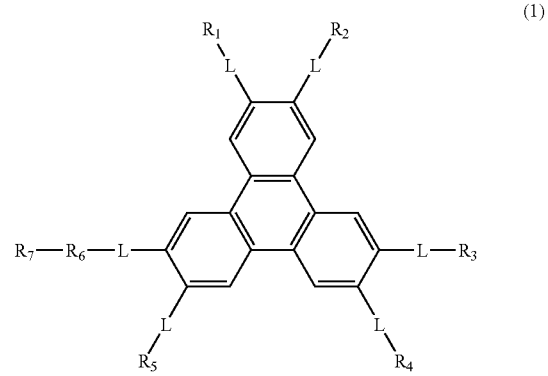

wherein L represents —O— or —S—, $R_1$, $R_2$, $R_3$, $R_4$ and $R_5$ may be identical or different and represent a hydrocarbon group having four or more carbon atoms, $R_6$ represents a divalent hydrocarbon group having four or more carbon atoms, $R_7$ represents —$SiR_8R_9R_{10}$ or —$P(=O)(OH)_2$, and $R_8$, $R_9$ and $R_{10}$ may be identical or different and represent —Cl, —OH, —$OCH_3$ or —$OC_2H_5$).

5 Claims, 8 Drawing Sheets

FOREIGN PATENT DOCUMENTS

| | | |
|---|---|---|
| JP | 2001-194654 | 7/2001 |
| JP | 2001-305549 | 10/2001 |
| JP | 2001-311080 | 11/2001 |
| JP | 2002-323701 | 11/2002 |
| JP | 2003-114437 | 4/2003 |
| JP | 2003-295194 | 10/2003 |
| JP | 2005-91738 | 4/2005 |
| JP | 2005-164828 | 6/2005 |
| JP | 2005-164829 | 6/2005 |
| JP | 2005-164830 | 6/2005 |
| JP | 2006-516757 | 7/2006 |
| JP | 2006-251592 | 9/2006 |
| JP | 2006-251593 | 9/2006 |
| JP | 2006-251606 | 9/2006 |
| JP | 2006-251612 | 9/2006 |
| JP | 2007-191404 | 8/2007 |

* cited by examiner

LIQUID CRYSTAL ALIGNMENT FILM COMPOSITION, LIQUID CRYSTAL DEVICE AND DISPLAY APPARATUS

BACKGROUND OF THE INVENTION

1. Field of the Invention

The present invention relates to a liquid crystal alignment film composition for forming an alignment film that vertically aligns liquid crystal, a liquid crystal device and a display apparatus.

2. Description of the Related Art

Liquid crystal display devices employing a twisted nematic mode are widely used as one type of liquid crystal devices. Development has actively proceeded in recent years on liquid crystal display devices employing a vertical alignment mode in which liquid crystal molecules having negative dielectric anisotropy resulting in superior viewing angle dependence and contrast ratio are aligned perpendicular to a substrate such that the liquid crystal molecules are activated in parallel with the substrate by application of a voltage.

Examples of methods for aligning liquid crystal molecules perpendicular to a substrate are disclosed in which a liquid crystal alignment film composed of a polyimide is provided on an ITO side of a glass substrate (Japanese Patent Application Laid-Open (JP-A) Nos. 2001-305549, 2001-311080, 2002-323701 and 2003-295194). These methods form a vertical alignment film by applying a solution, prepared by dissolving a polyamic acid and the like in an organic solvent, with a spinner or the like followed by imidization of the coat by heat treatment at 120° C. to 250° C. and rubbing treatment using a felt cloth or the like to impart a vertical alignment ability.

In addition, a method has been disclosed that uses a polyimide resin material for non-rubbing vertical alignment that aligns liquid crystal molecules perpendicular to a substrate by a non-rubbing method (JP-A No. 2006-516757). In this method, a vertical alignment film is formed by applying a polyamic acid by spin coating followed by preliminarily firing a substrate at 100° C. for 30 minutes and imidizing by firing at 250° C. for 1 hour.

Moreover, a method has been disclosed for providing a vertical alignment film by using a liquid crystal alignment agent composed of a polyamic acid and the like having a conjugated enone structure (JP-A No. 2003-114437). In this method, a vertical alignment ability is imparted by applying a solution containing an alignment agent dissolved in an organic solvent by the use of a spinner or the like, followed by imidization by heat treatment at 150° C. to 250° C. and irradiation with ultraviolet light with a wavelength of 320 nm to 450 nm.

However, in the case TFTs and interconnections are formed on the substrate surface, a liquid crystal alignment film formed according to the methods described above had the problem of preventing the obtaining of a liquid crystal alignment film with uniform thickness due to the occurrence of coating unevenness attributable to the presence of irregularities over the substrate surface.

In addition, since heat treatment is carried out at 120° C. to 250° C. after coating with a spinner or the like, these methods had the problem of preventing the substrate from being applied to substrates other than glass substrates in the form of flexible, general-purpose plastic films.

Moreover, in the case of expressing an alignment ability by a rubbing method, uneven rubbing occurs due to the presence of irregularities in the substrate surface, thereby resulting in uneven alignment and causing the problem of the occurrence of disturbances in liquid crystal alignment.

In addition, rubbing methods involving rubbing an alignment film with a rubbing cloth are susceptible to the generation of static electricity and fine debris while also making TFT susceptible to damage, thereby resulting in the occurrence of display defects.

BRIEF SUMMARY OF THE INVENTION

Thus, in order to solve the above-mentioned problems, an object of the present invention is to provide an alignment film composition that does not require high-temperature heat treatment or rubbing treatment and allows the formation of a homogeneous alignment film that has superior vertical alignment ability and is free of unevenness, a liquid crystal device using that liquid crystal alignment film composition, and a memory-effect liquid crystal device having bistability.

Means for Solving the Problems are as Follows

<1> A liquid crystal alignment film composition including: one type of triphenylene compound (I) represented by the following general formula (1):

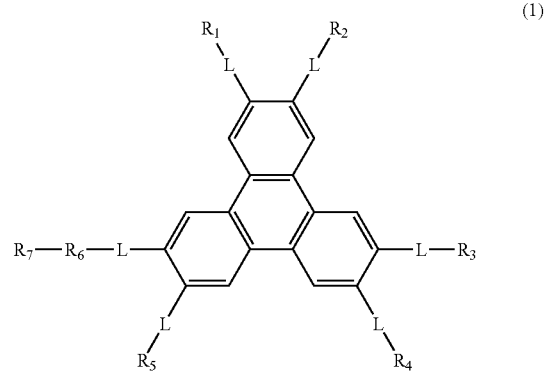

wherein L represents —O— or —S—, $R_1$, $R_2$, $R_3$, $R_4$ and $R_5$ may be identical or different and represent a hydrocarbon group having four or more carbon atoms, $R_6$ represents a divalent hydrocarbon group having four or more carbon atoms, $R_7$ represents —$SiR_8R_9R_{10}$ or —$P(=O)(OH)_2$, and $R_8$, $R_9$ and $R_{10}$ may be identical or different and represent —Cl, —OH, —$OCH_3$ or —$OC_2H_5$).

<2> The liquid crystal alignment film composition according to <1>, wherein the liquid crystal alignment film composition comprises the triphenylene compound (I) represented by the general formula (1) and a compound (A) represented by the general formula $R_{11}$-$R_7$, wherein $R_{11}$ is a linear hydrocarbon group having four or more carbon atoms and $R_7$ represents —$SiR_8R_9R_{10}$ or —$P(=O)(OH)_2$.

<3> A liquid crystal device including the liquid crystal alignment film according to one of <1> and <2>.

<4> The liquid crystal device according to <3>, wherein the liquid crystal device uses a liquid crystal composition which comprises one type of triphenylene compound (II) represented by the following general formula (2) and a chiral agent:

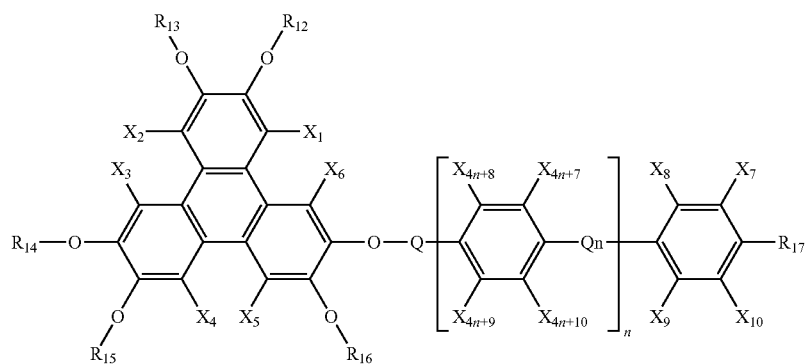

(2)

wherein $R_{12}$, $R_{13}$, $R_{14}$, $R_{15}$ and $R_{16}$ may be identical or different and represent a hydrocarbon group having four or more carbon atoms, $R_{17}$ represents an alkyl group, alkoxy group or alkoxycarbonyl group having three or more carbon atoms, $X_1$, $X_2$, $X_3$, $X_4$, $X_5$, $X_6$, $X_7$, $X_8$, $X_9$, $X_{10}$, $X_{4n+7}$, $X_{4n+8}$, $X_{4n+9}$ and $X_{4n+10}$ represent a hydrogen atom, fluorine atom or chlorine atom, n represents an integer of 1 or more, Q represents a divalent group having four or more carbon atoms with —C(=O), —O—, —C(=O)—O— or —O—C(=O)— on one or both ends thereof, and Qn represents —C(=O)—O— or —O—C(=O)—.

<5> A display apparatus including the liquid crystal device according to one of <3> and <4>.

According to the present invention, a liquid crystal alignment film composition that does not require high-temperature heat treatment or rubbing treatment and allows the formation of a homogeneous alignment film that has superior vertical alignment ability and is free of unevenness, a liquid crystal device that is free of disturbances in liquid crystal orientation and display defects, and a memory-effect liquid crystal device having bistability can be provided.

DETAILED DESCRIPTION OF THE INVENTION

Figure 1:
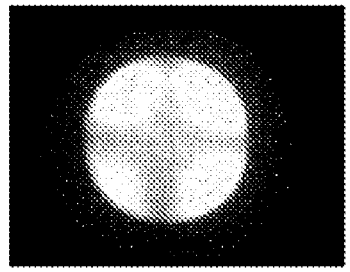
FIG. 1 is a conoscopic image of a liquid crystal device obtained in Example 1.

The liquid crystal alignment film composition of the present invention contains at least one type of triphenylene compound (I) represented by the following general formula (1):

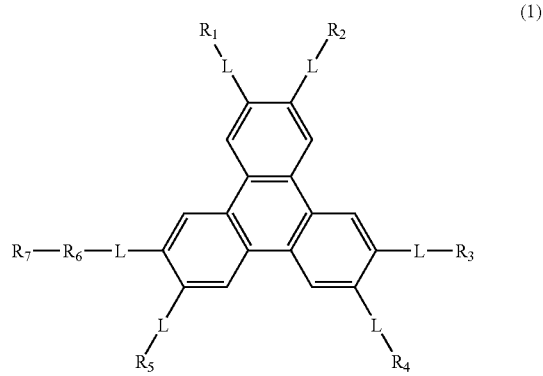

(1)

wherein L represents —O— or —S—, $R_1$, $R_2$, $R_3$, $R_4$ and $R_5$ may be identical or different and represent a hydrocarbon group having 4 or more carbon atoms, $R_6$ represents a divalent hydrocarbon group having 4 or more carbon atoms, $R_7$ represents —SiR$_8$R$_9$R$_{10}$ or —P(=O)(OH)$_2$, and R$_8$, R$_9$ and R$_{10}$ may be identical or different and represent —Cl, —OH, —OCH$_3$ or —OC$_2$H$_5$.

The triphenylene compound (I) represented by general formula (1) is composed of an adsorptive portion, namely the portion represented by substituent R$_7$, which chemically or physically adsorbs to ITO or other transparent electrode provided on a glass substrate or plastic film substrate, and of an alignment control portion, namely the triphenylene portion having substituents R$_1$-L-, R$_2$-L-, R$_3$-L-, R$_4$-L-, R$_5$-L- and —R$_6$-L-, which controls the alignment of liquid crystal molecules by forming a stable structure as a result of π-π stacking in the direction parallel to the substrate surface (namely, the triphenylene groups are aligned in a direction perpendicular to the substrate).

Namely, the substituent R$_7$ of the adsorptive portion represents —SiR$_8$R$_9$R$_{10}$ or —P(=O)(OH)$_2$, while the substituents R$_8$, R$_9$ and R$_{10}$ may be identical or different and represent —Cl, —OH, —OCH$_3$ or —OC$_2$H$_5$, and are able to chemically or physically adsorb to ITO or other transparent electrode provided on a glass substrate or plastic film substrate.

In addition, the substituents R$_1$, R$_2$, R$_3$, R$_4$ and R$_5$ of the alignment control portion may be identical or different and represent a hydrocarbon group having 4 or more carbon atoms, while hydrocarbon groups having 3 or fewer carbon atoms do not demonstrate satisfactory vertical alignment ability. More specifically, examples of hydrocarbon groups having 4 carbons or more include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl and triacontyl groups. Hydrocarbon groups having 4 to 12 carbon atoms are preferable.

The substituent R$_6$ is a divalent hydrocarbon group having 4 or more carbon atoms that may be identical to or different from the substituents R$_1$, R$_2$, R$_3$, R$_4$ and R$_5$, specific examples of which include butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicosylene (icosylene), heneicosylene (henicosylene), docosylene, tricosylene, tetracosylene, pentacosylene, hexacosylene, heptacosylene, octacosylene, nonacosylene and triacontylene groups. The substituent R$_6$ is preferably a hydrocarbon group having 8 to 18 carbon atoms, and in order to effectively adsorb the substituent R$_7$ to the substrate, is a hydrocarbon group having the number of carbons greater than the number of carbons of the adjacent substituent R$_5$.

In addition, although the liquid crystal alignment film composition of the present invention can also use a plurality of triphenylene compounds (I) represented by general formula (1), in order to demonstrate satisfactory vertical alignment ability, it is preferable to use compounds having hydrocarbon groups of the same number of carbons for substituent R$_6$ to maintain a constant distance between the triphenylene portion and the substrate.

A triphenylene compound (I) represented by general formula (1) can be produced according to a method as indicated in the following formulas without being limiting by the linking group L and the substituents R$_1$ to R$_6$ (see J. Mater. Chem., 2001, 11, 1612-1617; J. Am. Chem. Soc., 2004, 126, 3856-3867; J. Mater. Chem., 1997, 7, 601-605; Liquid Crystals, 2003, 30, 571-578; Org. Synth. Coll. Vol. VI, 1988, 700; J. Mater. Chem., 1997, 7, 601-605; J. Org. Chem., 1963, 28, 2975-2979; Langmuir, 2000, 16, 7449-7456).

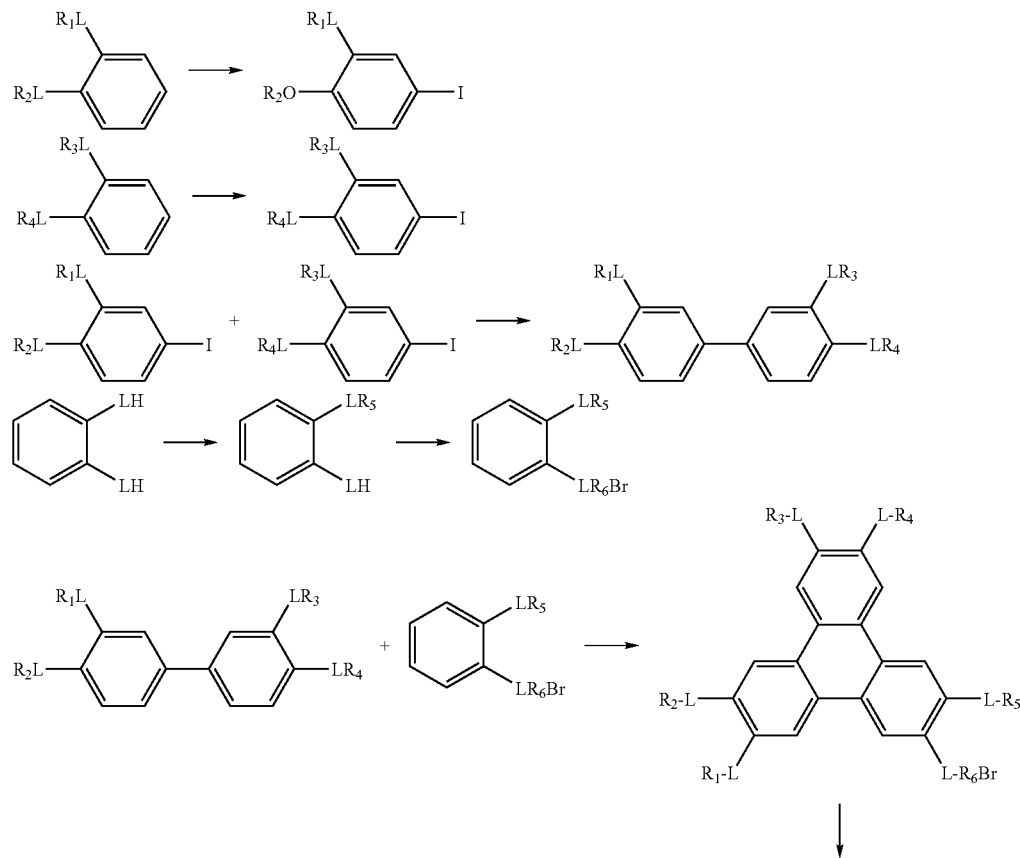

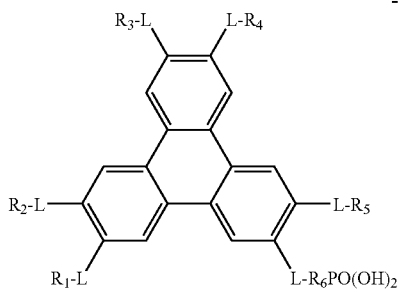

-continued

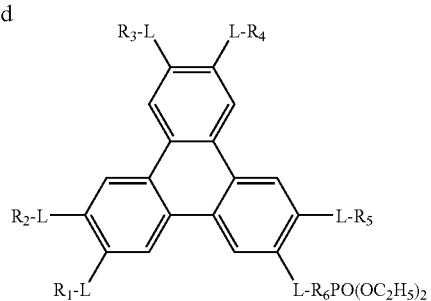

The following lists examples of compounds that can be used for the triphenylene compounds (I) represented by general formula (1).

Nos. 1 to 8: [18-(3,6,7,10,11-pentaquisbutyl(oxy or thio) triphenylene-2-yl(oxy or thio))-octadecyl]-phosphonic acid, namely:

No. 1: [18-(3,6,7,10,11-pentaquisbutyloxytriphenylene-2-yloxy)-octadecyl]-phosphonic acid, No. 2: [18-(3,6,7,10,11-pentaquisbutyloxytriphenylene-2-ylthio)-octadecyl]-phosphonic acid, No. 3: [18-(3,6,7,10,11-pentaquisbutylthiotriphenylene-2-yloxy)-octadecyl]-phosphonic acid, No. 4: [18-(3,6,7,10,11-pentaquisbutylthiotriphenylene-2-ylthio)-octadecyl]-phosphonic acid, No. 5: [18-(3,6,7,10,11-pentaquispentyloxytriphenylene-2-yloxy)-octadecyl]-phosphonic acid, No. 6: [18-(3,6,7,10,11-pentaquispentyloxytriphenylene-2-ylthio)-octadecyl]-phosphonic acid, No. 7: [18-(3,6,7,10,11-pentaquispentylthiotriphenylene-2-yloxy)-octadecyl]-phosphonic acid, No. 8: [18-(3,6,7,10,11-pentaquispentylthiotriphenylene-2-ylthio)-octadecyl]-phosphonic acid.

Nos. 9 to 12: [18-(3,6,7,10,11-pentaquishexyl(oxy or thio) triphenylene-2-yl(oxy or thio))-octadecyl]-phosphonic acid.

Nos. 13 to 16: [18-(3,6,7,10,11-pentaquisheptyl(oxy or thio) triphenylene-2-yl(oxy or thio))-octadecyl]-phosphonic acid.

Nos. 17 to 20: [18-(3,6,7,10,11-pentaquisoctyl(oxy or thio) triphenylene-2-yl(oxy or thio))-octadecyl]-phosphonic acid.

Nos. 21 to 24: [18-(3,6,7,10,11-pentaquisnonyl(oxy or thio) triphenylene-2-yl(oxy or thio))-octadecyl]-phosphonic acid.

Nos. 25 to 28: [18-(3,6,7,10,11-pentaquisdecyl(oxy or thio) triphenylene-2-yl(oxy or thio))-octadecyl]-phosphonic acid.

Nos. 29 to 32: [18-(3,6,7,10,11-pentaquisundecyl(oxy or thio)triphenylene-2-yl(oxy or thio))-octadecyl]-phosphonic acid.

Nos. 33 to 36: [18-(3,6,7,10,11-pentaquisdodecyl(oxy or thio)triphenylene-2-yl(oxy or thio))-octadecyl]-phosphonic acid.

Nos. 37 to 40: [18-(3,6,7,10,11-pentaquistridecyl(oxy or thio)triphenylene-2-yl(oxy or thio))-octadecyl]-phosphonic acid.

Nos. 41 to 44: [18-(3,6,7,10,11-pentaquistetradecyl(oxy or thio)triphenylene-2-yl(oxy or thio))-octadecyl]-phosphonic acid.

Nos. 45 to 48: [16-(3,6,7,10,11-pentaquisbutyl(oxy or thio) triphenylene-2-yl(oxy or thio))-hexadecyl]-phosphonic acid.

Nos. 49 to 52: [16-(3,6,7,10,11-pentaquispentyl(oxy or thio) triphenylene-2-yl(oxy or thio))-hexadecyl]-phosphonic acid.

Nos. 53 to 56: [16-(3,6,7,10,11-pentaquishexyl(oxy or thio) triphenylene-2-yl(oxy or thio))-hexadecyl]-phosphonic acid.

Nos. 57 to 60: [16-(3,6,7,10,11-pentaquisheptyl(oxy or thio) triphenylene-2-yl(oxy or thio))-hexadecyl]-phosphonic acid.

Nos. 61 to 64: [16-(3,6,7,10,11-pentaquisoctyl(oxy or thio) triphenylene-2-yl(oxy or thio))-hexadecyl]-phosphonic acid.

Nos. 65 to 68: [16-(3,6,7,10,11-pentaquisnonyl(oxy or thio) triphenylene-2-yl(oxy or thio))-hexadecyl]-phosphonic acid.

Nos. 69 to 72: [16-(3,6,7,10,11-pentaquisdecyl(oxy or thio) triphenylene-2-yl(oxy or thio))-hexadecyl]-phosphonic acid.

Nos. 73 to 76: [16-(3,6,7,10,11-pentaquisundecyl(oxy or thio)triphenylene-2-yl(oxy or thio))-hexadecyl]-phosphonic acid.

Nos. 77 to 80: [16-(3,6,7,10,11-pentaquisdodecyl(oxy or thio)triphenylene-2-yl(oxy or thio))-hexadecyl]-phosphonic acid.

Nos. 81 to 84: [14-(3,6,7,10,11-pentaquisbutyl(oxy or thio) triphenylene-2-yl(oxy or thio))-tetradecyl]-phosphonic acid.

Nos. 85 to 88: [14-(3,6,7,10,11-pentaquispentyl(oxy or thio) triphenylene-2-yl(oxy or thio))-tetradecyl]-phosphonic acid.

Nos. 89 to 92: [14-(3,6,7,10,11-pentaquishexyl(oxy or thio) triphenylene-2-yl(oxy or thio))-tetradecyl]-phosphonic acid.

Nos. 93 to 96: [14-(3,6,7,10,11-pentaquisheptyl(oxy or thio) triphenylene-2-yl(oxy or thio))-tetradecyl]-phosphonic acid.

Nos. 97 to 100: [14-(3,6,7,10,11-pentaquisoctyl(oxy or thio) triphenylene-2-yl(oxy or thio))-tetradecyl]-phosphonic acid.

Nos. 101 to 104: [14-(3,6,7,10,11-pentaquisnonyl(oxy or thio)triphenylene-2-yl(oxy or thio))-tetradecyl]-phosphonic acid.

Nos. 105 to 108: [14-(3,6,7,10,11-pentaquisdecyl(oxy or thio)triphenylene-2-yl(oxy or thio))-tetradecyl]-phosphonic acid.

Nos. 109 to 112: [12-(3,6,7,10,11-pentaquisbutyl(oxy or thio)triphenylene-2-yl(oxy or thio))-dodecyl]-phosphonic acid.

Nos. 113 to 116: [12-(3,6,7,10,11-pentaquispentyl(oxy or thio)triphenylene-2-yl(oxy or thio))-dodecyl]-phosphonic acid.
Nos. 117 to 120: [12-(3,6,7,10,11-pentaquishexyl(oxy or thio)triphenylene-2-yl(oxy or thio))-dodecyl]-phosphonic acid.
Nos. 121 to 124: [12-(3,6,7,10,11-pentaquisheptyl(oxy or thio)triphenylene-2-yl(oxy or thio))-dodecyl]-phosphonic acid.
Nos. 125 to 128: [12-(3,6,7,10,11-pentaquisoctyl(oxy or thio)triphenylene-2-yl(oxy or thio))-dodecyl]-phosphonic acid.
Nos. 129 to 132: [11-(3,6,7,10,11-pentaquisbutyl(oxy or thio)triphenylene-2-yl(oxy or thio))-undecyl]-phosphonic acid.
Nos. 133 to 136: [11-(3,6,7,10,11-pentaquispentyl(oxy or thio)triphenylene-2-yl(oxy or thio))-undecyl]-phosphonic acid.
Nos. 137 to 140: [11-(3,6,7,10,11-pentaquishexyl(oxy or thio)triphenylene-2-yl(oxy or thio))-undecyl]-phosphonic acid.
Nos. 141 to 144: [11-(3,6,7,10,11-pentaquisheptyl(oxy or thio)triphenylene-2-yl(oxy or thio))-undecyl]-phosphonic acid.
Nos. 145 to 148: [8-(3,6,7,10,11-pentaquisbutyl(oxy or thio)triphenylene-2-yl(oxy or thio))-octyl]-phosphonic acid.
Nos. 149 to 152: [8-(3,6,7,10,11-pentaquispentyl(oxy or thio)triphenylene-2-yl(oxy or thio))-octyl]-phosphonic acid.
Nos. 153 to 176: [18-(3,6,7,10,11-pentaquisbutyl(oxy or thio)triphenylene-2-yl(oxy or thio))-octadecyl]-tri(chloro, methoxy or ethoxy)silane, namely:
No. 153: [18-(3,6,7,10,11-pentaquisbutyloxytriphenylene-2-yloxy)-octadecyl]-trichlorosilane,
No. 154: [18-(3,6,7,10,11-pentaquisbutyloxytriphenylene-2-yloxy)-octadecyl]-trimethoxyosilane,
No. 155: [18-(3,6,7,10,11-pentaquisbutyloxytriphenylene-2-yloxy)-octadecyl]-triethoxyosilane,
No. 156: [18-(3,6,7,10,11-pentaquisbutyloxytriphenylene-2-ylthio)-octadecyl]-trichlorosilane,
No. 157: [18-(3,6,7,10,11-pentaquisbutyloxytriphenylene-2-ylthio)-octadecyl]-trimethoxyosilane,
No. 158: [18-(3,6,7,10,11-pentaquisbutyloxytriphenylene-2-ylthio)-octadecyl]-triethoxyosilane,
No. 159: [18-(3,6,7,10,11-pentaquisbutylthiotriphenylene-2-yloxy)-octadecyl]-trichlorosilane,
No. 160: [18-(3,6,7,10,11-pentaquisbutylthiotriphenylene-2-yloxy)-octadecyl]-trimethoxyosilane,
No. 161: [18-(3,6,7,10,11-pentaquisbutylthiotriphenylene-2-yloxy)-octadecyl]-triethoxyosilane,
No. 162: [18-(3,6,7,10,11-pentaquisbutylthiotriphenylene-2-ylthio)-octadecyl]-trichlorosilane,
No. 163: [18-(3,6,7,10,11-pentaquisbutylthiotriphenylene-2-ylthio)-octadecyl]-trimethoxyosilane,
No. 164: [18-(3,6,7,10,11-pentaquisbutylthiotriphenylene-2-ylthio)-octadecyl]-triethoxyosilane,
No. 165: [18-(3,6,7,10,11-pentaquispentyloxytriphenylene-2-yloxy)-octadecyl]-trichlorosilane,
No. 166: [18-(3,6,7,10,11-pentaquispentyloxytriphenylene-2-yloxy)-octadecyl]-trimethoxyosilane,
No. 167: [18-(3,6,7,10,11-pentaquispentyloxytriphenylene-2-yloxy)-octadecyl]-triethoxyosilane,
No. 168: [18-(3,6,7,10,11-pentaquispentyloxytriphenylene-2-ylthio)-octadecyl]-trichlorosilane,
No. 169: [18-(3,6,7,10,11-pentaquispentyloxytriphenylene-2-ylthio)-octadecyl]-trimethoxyosilane,
No. 170: [18-(3,6,7,10,11-pentaquispentyloxytriphenylene-2-ylthio)-octadecyl]-triethoxyosilane,
No. 171: [18-(3,6,7,10,11-pentaquispentylthiotriphenylene-2-yloxy)-octadecyl]-trichlorosilane,
No. 172: [18-(3,6,7,10,11-pentaquispentylthiotriphenylene-2-yloxy)-octadecyl]-trimethoxyosilane,
No. 173: [18-(3,6,7,10,11-pentaquispentylthiotriphenylene-2-yloxy)-octadecyl]-triethoxyosilane,
No. 174: [18-(3,6,7,10,11-pentaquispentylthiotriphenylene-2-ylthio)-octadecyl]-trichlorosilane,
No. 175: [18-(3,6,7,10,11-pentaquispentylthiotriphenylene-2-ylthio)-octadecyl]-trimethoxyosilane,
No. 176: [18-(3,6,7,10,11-pentaquispentylthiotriphenylene-2-ylthio)-octadecyl]-triethoxyosilane.
Nos. 177 to 188: [18-(3,6,7,10,11-pentaquishexyl(oxy or thio)triphenylene-2-yl(oxy or thio))-octadecyl]-tri(chloro, methoxy or ethoxy)silane.
Nos. 189 to 200: [18-(3,6,7,10,11-pentaquisheptyl(oxy or thio)triphenylene-2-yl(oxy or thio))-octadecyl]-tri(chloro, methoxy or ethoxy)silane.
Nos. 201 to 212: [18-(3,6,7,10,11-pentaquisoctyl(oxy or thio)triphenylene-2-yl(oxy or thio))-octadecyl]-tri(chloro, methoxy or ethoxy)silane.
Nos. 213 to 224: [18-(3,6,7,10,11-pentaquisnonyl(oxy or thio)triphenylene-2-yl(oxy or thio))-octadecyl]-tri(chloro, methoxy or ethoxy)silane.
Nos. 225 to 236: [18-(3,6,7,10,11-pentaquisdecyl(oxy or thio)triphenylene-2-yl(oxy or thio))-octadecyl]-tri(chloro, methoxy or ethoxy)silane.
Nos. 237 to 248: [18-(3,6,7,10,11-pentaquisundecyl(oxy or thio)triphenylene-2-yl(oxy or thio))-octadecyl]-tri(chloro, methoxy or ethoxy)silane.
Nos. 249 to 260: [18-(3,6,7,10,11-pentaquisdodecyl(oxy or thio)triphenylene-2-yl(oxy or thio))-octadecyl]-tri(chloro, methoxy or ethoxy)silane.
Nos. 261 to 272: [18-(3,6,7,10,11-pentaquistridecyl(oxy or thio)triphenylene-2-yl(oxy or thio))-octadecyl]-tri(chloro, methoxy or ethoxy)silane.
Nos. 273 to 284: [18-(3,6,7,10,11-pentaquistetradecyl(oxy or thio)triphenylene-2-yl(oxy or thio))-octadecyl]-tri(chloro, methoxy or ethoxy)silane.
Nos. 285 to 296: [16-(3,6,7,10,11-pentaquisbutyl(oxy or thio)triphenylene-2-yl(oxy or thio))-hexadecyl]-tri(chloro, methoxy or ethoxy)silane.
Nos. 297 to 308: [16-(3,6,7,10,11-pentaquispentyl(oxy or thio)triphenylene-2-yl(oxy or thio))-hexadecyl]-tri(chloro, methoxy or ethoxy)silane.
Nos. 309 to 320: [16-(3,6,7,10,11-pentaquishexyl(oxy or thio)triphenylene-2-yl(oxy or thio))-hexadecyl]-tri(chloro, methoxy or ethoxy)silane.
Nos. 321 to 332: [16-(3,6,7,10,11-pentaquisheptyl(oxy or thio)triphenylene-2-yl(oxy or thio))-hexadecyl]-tri(chloro, methoxy or ethoxy)silane.
Nos. 333 to 344: [16-(3,6,7,10,11-pentaquisoctyl(oxy or thio)triphenylene-2-yl(oxy or thio))-hexadecyl]-tri(chloro, methoxy or ethoxy)silane.
Nos. 345 to 356: [16-(3,6,7,10,11-pentaquisnonyl(oxy or thio)triphenylene-2-yl(oxy or thio))-hexadecyl]-tri(chloro, methoxy or ethoxy)silane.
Nos. 357 to 368: [16-(3,6,7,10,11-pentaquisdecyl(oxy or thio)triphenylene-2-yl(oxy or thio))-hexadecyl]-tri(chloro, methoxy or ethoxy)silane.
Nos. 369 to 380: [16-(3,6,7,10,11-pentaquisundecyl(oxy or thio)triphenylene-2-yl(oxy or thio))-hexadecyl]-tri(chloro, methoxy or ethoxy)silane.

Nos. 381 to 392: [16-(3,6,7,10,11-pentaquisdodecyl(oxy or thio)triphenylene-2-yl(oxy or thio))-hexadecyl]-tri(chloro, methoxy or ethoxy)silane.

Nos. 393 to 414: [14-(3,6,7,10,11-pentaquisbutyl(oxy or thio)triphenylene-2-yl(oxy or thio))-tetradecyl]-tri(chloro, methoxy or ethoxy)silane.

Nos. 415 to 426: [14-(3,6,7,10,11-pentaquispentyl(oxy or thio)triphenylene-2-yl(oxy or thio))-tetradecyl]-tri(chloro, methoxy or ethoxy)silane.

Nos. 427 to 438: [14-(3,6,7,10,11-pentaquishexyl(oxy or thio)triphenylene-2-yl(oxy or thio))-tetradecyl]-tri(chloro, methoxy or ethoxy)silane.

Nos. 439 to 450: [14-(3,6,7,10,11-pentaquisheptyl(oxy or thio)triphenylene-2-yl(oxy or thio))-tetradecyl]-tri(chloro, methoxy or ethoxy)silane.

Nos. 451 to 462: [14-(3,6,7,10,11-pentaquisoctyl(oxy or thio)triphenylene-2-yl(oxy or thio))-tetradecyl]-tri(chloro, methoxy or ethoxy)silane.

Nos. 463 to 474: [14-(3,6,7,10,11-pentaquisnonyl(oxy or thio)triphenylene-2-yl(oxy or thio))-tetradecyl]-tri(chloro, methoxy or ethoxy)silane.

Nos. 475 to 486: [14-(3,6,7,10,11-pentaquisdecyl(oxy or thio)triphenylene-2-yl(oxy or thio))-tetradecyl]-tri(chloro, methoxy or ethoxy)silane.

Nos. 487 to 498: [12-(3,6,7,10,11-pentaquisbutyl(oxy or thio)triphenylene-2-yl(oxy or thio))-dodecyl]-tri(chloro, methoxy or ethoxy)silane.

Nos. 499 to 510: [12-(3,6,7,10,11-pentaquispentyl(oxy or thio)triphenylene-2-yl(oxy or thio))-dodecyl]-tri(chloro, methoxy or ethoxy)silane.

Nos. 511 to 522: [12-(3,6,7,10,11-pentaquishexyl(oxy or thio)triphenylene-2-yl(oxy or thio))-dodecyl]-tri(chloro, methoxy or ethoxy)silane.

Nos. 523 to 534: [12-(3,6,7,10,11-pentaquisheptyl(oxy or thio)triphenylene-2-yl(oxy or thio))-dodecyl]-tri(chloro, methoxy or ethoxy)silane.

Nos. 535 to 546: [12-(3,6,7,10,11-pentaquisoctyl(oxy or thio)triphenylene-2-yl(oxy or thio))-dodecyl]-tri(chloro, methoxy or ethoxy)silane.

Nos. 547 to 558: [11-(3,6,7,10,11-pentaquisbutyl(oxy or thio)triphenylene-2-yl(oxy or thio))-undecyl]-tri(chloro, methoxy or ethoxy)silane.

Nos. 559 to 570: [11-(3,6,7,10,11-pentaquispentyl(oxy or thio)triphenylene-2-yl(oxy or thio))-undecyl]-tri(chloro, methoxy or ethoxy)silane.

Nos. 571 to 582: [11-(3,6,7,10,11-pentaquishexyl(oxy or thio)triphenylene-2-yl(oxy or thio))-undecyl]-tri(chloro, methoxy or ethoxy)silane.

Nos. 583 to 594: [11-(3,6,7,10,11-pentaquisheptyl(oxy or thio)triphenylene-2-yl(oxy or thio))-undecyl]-tri(chloro, methoxy or ethoxy)silane.

Nos. 595 to 606: [8-(3,6,7,10,11-pentaquisbutyl(oxy or thio)triphenylene-2-yl(oxy or thio))-octyl]-tri(chloro, methoxy or ethoxy) silane.

Nos. 607 to 618: [8-(3,6,7,10,11-pentaquispentyl(oxy or thio)triphenylene-2-yl(oxy or thio))-octyl]-tri(chloro, methoxy or ethoxy)silane, and others.

Moreover, a compound (A) having a linear hydrocarbon group having the substituent $R_7$ on an end thereof can be used by mixing into the liquid crystal alignment film composition of the present invention in addition to the triphenylene compound (I) represented by general formula (1). Examples of linear hydrocarbon groups having the substituent $R_7$ on an end thereof include compounds having a linear hydrocarbon group represented by general formula $R_{11}$-$R_7$ (wherein, $R_{11}$ is a linear hydrocarbon group having 4 or more carbon atoms, and $R_7$ is the same as previously defined).

A compound (A) represented by the general formula $R_{11}$-$R_7$ is composed of an adsorptive portion, namely the portion represented by substituent $R_7$, which chemically or physically adsorbs to ITO or other transparent electrode provided on a glass substrate or plastic film substrate in the same manner as a compound represented by general formula (1), and of a portion that aggregates due to van der Walls forces and the like, namely the portion represented by substituent $R_{11}$. The substituent $R_{11}$ has the function of further stabilizing the structure of a liquid crystal alignment film since it aggregates with itself and with the portion represented by substituent $R_6$ of triphenylene compound (I) represented by general formula (1).

Specific examples of substituent $R_{11}$ include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl and triacontyl groups. An alkyl group, having the number of carbons equal to or less than the number of carbons of the substituent $R_6$ that determines the distance between the triphenylene portion in general formula (1) and the substrate, is preferable in order to demonstrate satisfactory vertical alignment ability.

The mixing ratio of the triphenylene compound (I) represented by general formula (1) and the compound (A) represented by $R_{11}$-$R_7$ is a molar ratio of 1:0.1 to 1:40 and more preferably a molar ratio of 1:0.5 to 1:10.

In addition, in order to obtain a homogeneous alignment film, the liquid crystal alignment film composition of the present invention is preferably used in the form of a solution dissolved in an organic solvent that dissolves the triphenylene compound (I) represented by general formula (1) or the triphenylene compound (I) represented by general formula (1) and the compound (A) represented by general formula $R_{11}$-$R_7$, and the alignment film is formed by allowing a substrate to stand in the solution for a prescribed amount of time followed by washing and drying at room temperature. This results in the formation of a homogeneous liquid crystal alignment film having superior vertical alignment ability and free of unevenness without carrying out heat treatment or rubbing treatment.

A low boiling point organic solvent is preferable for the organic solvent in terms of dissolving the triphenylene compound (I) represented by general formula (1) and drying.

In addition, a liquid crystal device that uses the liquid crystal alignment film composition of the present invention can be produced by immersing a glass substrate or plastic substrate provided with ITO or other electrode in a liquid crystal alignment composition as described above, followed by forming an alignment film on the ITO by washing and drying, arranging the electrode surfaces in mutual opposition to produce a display cell having a prescribed distance between the electrode surfaces due to the presence of a spacer, and injecting a liquid crystal composition. A known composition can be used for the liquid crystal composition. Any liquid crystal composition having different dielectric anisotropy can be used.

Figure 15:
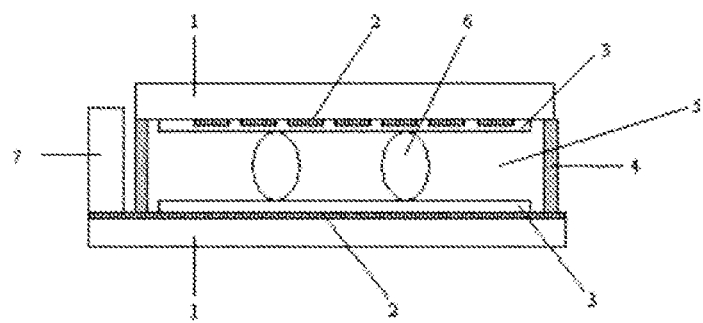
FIG. 15 is a cross-sectional view of a display device showing an example of a liquid crystal device of the present invention.

A cross-sectional view of a typical liquid crystal device of the present invention is shown in FIG. 15. This liquid crystal device is composed of a substrate 1, an electrode 2, a liquid crystal alignment film 3, a sealant 4, a liquid crystal composition 5, a spacer 6 and a drive circuit 7. An optical film such as a polarizer or a reflector can also be used according to display mode.

Moreover, the liquid crystal device of the present invention is provided with an alignment film composed of a liquid crystal alignment film composition containing at least one type of the triphenylene compound (I) represented by the general formula (1), and uses a liquid crystal composition containing at least one type of a triphenylene compound (II) represented by the following general formula (2) and a chiral agent.

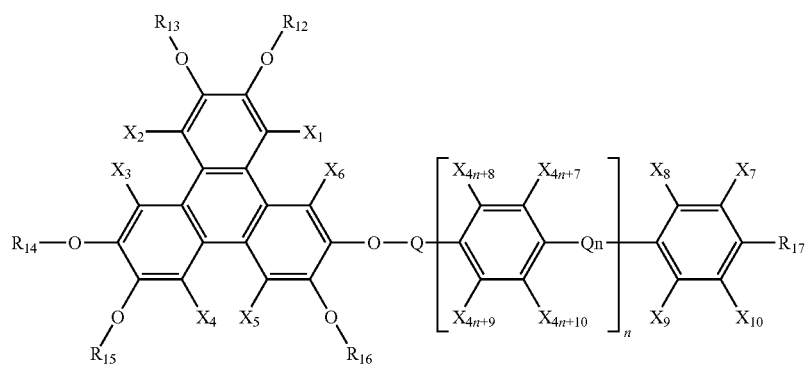

(2)

wherein, $R_{12}$, $R_{13}$, $R_{14}$, $R_{15}$ and $R_{16}$ may be identical or different and represent a hydrocarbon group having 4 or more carbon atoms, $R_{17}$ represents an alkyl group, alkoxy group or alkoxycarbonyl group having 3 or more carbon atoms, $X_1$, $X_2$, $X_3$, $X_4$, $X_5$, $X_6$, $X_7$, $X_8$, $X_9$, $X_{10}$, $X_{4n+7}$, $X_{4n+8}$, $X_{4n+9}$ and $X_{4n+10}$ represent a hydrogen atom, fluorine atom or chlorine atom, n represents an integer of 1 or more, Q represents a divalent group having 4 or more carbon atoms with —C(=O)—, —O—, —C(=O)—O— or —O—C(=O)— on one or both ends thereof, and Qn represents —C(=O)—O— or —O—C(=O)—.

The triphenylene compound (II) represented by general formula (2) contained in a liquid crystal composition of the liquid crystal device of the present invention is composed of a disk-shaped discotic liquid crystalline triphenylene portion, and a rod-shaped calamitic liquid crystalline aromatic ester portion.

The disk-shaped discotic liquid crystalline triphenylene portion aligns the disk surface in a direction parallel to the normal direction of the alignment film plane by interacting with alignment film surface triphenylene groups present on the uppermost surface of the liquid crystal alignment film composed of the triphenylene compound (I) represented by general formula (1). Thus, the rod-shaped calamitic liquid crystalline aromatic ester portion is able to align from the direction parallel to the normal direction of the alignment film plant to a direction close to the perpendicular. Accordingly, the liquid crystal composition in the liquid crystal device is able to demonstrate a homeotropic alignment, a planar alignment or an alignment intermediate to a homeotropic alignment and a planar alignment.

A known chiral agent can be used for the chiral agent, and this chiral agent imparts torsion to an alignment of liquid crystal molecules. The addition of a chiral agent to a liquid crystal composition having at least one type of triphenylene compound (II) represented by general formula (2) results in the manifestation of a unique phenomenon known as bistability.

Accordingly, a bistable liquid crystal device of the present invention provided with a liquid crystal alignment film composed of a liquid crystal alignment film composition containing at least one type of a triphenylene compound (I) represented by general formula (1), and using a liquid crystal composition containing at least one type of triphenylene compound (II) represented by general formula (2) and a chiral agent, can be used in the form of various displays including electronic paper since a displayed state can be maintained without consuming electrical power.

In order to realize such unique bistability, it is preferable to use 1 μmol to 100 μmol of the triphenylene compound (II) represented by general formula (2) based on 1 g of the liquid crystal composition, and an amount of chiral agent so that the helical pitch is 80% to 135% with respect to cell thickness. It is more preferable to use 5 μmol to 50 μmol of the triphenylene compound (II) represented by general formula (2) and an amount of chiral agent so that the helical pitch is 90% to 120% with respect to cell thickness.

$R_{12}$, $R_{13}$, $R_{14}$, $R_{15}$ and $R_{16}$ of the disk-shaped discotic liquid crystalline triphenylene portion of the compound (II) may be identical or different and represent a hydrocarbon group having 4 or more carbon atoms, while in the case of hydrocarbon groups having 3 or fewer carbon atoms, the discotic liquid crystalline triphenylene portion aggregates in the liquid crystal composition or the disk-shaped surface does not align in the direction parallel to the normal direction of the alignment film plane, thereby preventing the expression of bistability. More specifically, examples of hydrocarbon groups having 4 or more carbon atoms include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl and triacontyl groups. Hydrocarbon groups having 4 to 12 carbon atoms are preferable.

$X_1$, $X_2$, $X_3$, $X_4$, $X_5$ and $X_6$ of the discotic liquid crystalline triphenylene portion represent hydrogen atoms, fluorine atoms or chlorine atoms.

$X_7$, $X_8$, $X_9$, $X_{10}$, $X_{4n+7}$, $X_{4n+8}$, $X_{4n+9}$ and $X_{4n+10}$ of the rod-shaped calamitic liquid crystalline aromatic ester portion represent hydrogen atoms, fluorine atoms or chlorine atoms, and n represents an integer of 1 or more. As a result of using a fluorine atom or chlorine atom, and preferably a chlorine atom, for at least one of the group of substituents consisting of $X_7$, $X_8$, $X_9$, $X_{10}$, $X_{4n+7}$, $X_{4n+8}$, $X_{4n+9}$ and $X_{4n+10}$, the triphenylene compound (II) represented by general formula (2) exhibits two-frequency driving. Namely, the rod-shaped calamitic liquid crystalline aromatic ester portion exhibits positive dielectric anisotropy at low-frequency voltages of several kHz or less, and negative dielectric anisotropy at high-frequency voltages of several tens of kHz or more. Thus, alignment can be switched between a bistable planar alignment state and a homeotropic alignment by changing the frequency of the applied voltage.

Linking group Q between the discotic liquid crystalline triphenylene portion and the calamitic liquid crystalline aromatic ester portion is a divalent group having 4 or more carbon atoms with —C(=O)—, —O—, —C(=O)—O— or —O—C(=O)— on one or both ends thereof, and more specifically, the right end is bonded to the calamitic liquid crystalline aromatic ester portion, examples of which include —C(=O)—(CH$_2$)$_s$—C(=O)— (wherein, s is an integer of 2 or more), —C(=O)—(CH$_2$)$_s$—C(=O)—O— (wherein, s is an integer of 2 or more), —C(=O)—(CH$_2$)$_s$—O—C(=O)— (wherein, s is an integer of 2 or more), —C(=O)—(CH$_2$)$_t$—O— (wherein, t is an integer of 3 or more), —C(=O)—(CH$_2$)$_t$— (wherein, t is an integer of 3 or more), —(CH$_2$)$_t$—C(=O)— (wherein, t is an integer of 3 or more), —(CH$_2$)$_t$—C(=O)—O— (wherein, t is an integer of 3 or more), —(CH$_2$)$_t$—O—C(=O)— (wherein, t is an integer of 3 or more), —(CH$_2$)$_u$—O— (wherein, u is an integer of 4 or more), and —(CH$_2$)$_u$— (wherein, u is an integer of 4 or more). Since electric field response decreases if the linking group is excessively long, s, t and u are preferably 2 to 14, 3 to 15 and 4 to 16, respectively.

Qn of the calamitic liquid crystalline aromatic ester portion is —C(=O)—O— or —O—C(=O)—, and n is an integer of 1 or more. Since compatibility with the liquid crystal composition decreases as the molecular weight of the calamitic liquid crystalline aromatic ester portion increases, n is preferably 1 to 6, and more preferably 1 to 3.

$R_{17}$ represents an alkyl group, alkoxy group or alkoxycarbonyl group having 3 or more carbon atoms, specific examples of which include alkyl groups such as a propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl (icosyl) group, heneicosyl (henicosyl) group, docosyl group, tricosyl group, tetracosyl group, pentacosyl group, hexacosyl group, heptacosyl group, octacosyl group, nonacosyl group or triacontyl group;

alkyloxy groups such as a propyloxy group, butyloxy group, pentyloxy group, hexyloxy group, heptyloxy group, octyloxy group, nonyloxy group, decyloxy group, undecyloxy group, dodecyloxy group, tridecyloxy group, tetradecyloxy group, pentadecyloxy group, hexadecyloxy group, heptadecyloxy group, octadecyloxy group, nonadecyloxy group, eicosyloxy (icosyloxy group), heneicosyloxy (henicosyloxy) group, docosyloxy group, tricosyloxy group, tetracosyloxy group, pentacosyloxy group, hexacosyloxy group, heptacosyloxy group, octacosyloxy group, nonacosyloxy group or triacontyloxy group; and alkyloxycarbonyl groups such as a propyloxycarbonyl group, butyloxycarbonyl group, pentyloxycarbonyl group, hexyloxycarbonyl group, heptyloxycarbonyl group, octyloxycarbonyl group, nonyloxycarbonyl group, decyloxycarbonyl group, undecyloxycarbonyl group, dodecyloxycarbonyl group, tridecyloxycarbonyl group, tetradecyloxycarbonyl group, pentadecyloxycarbonyl group, hexadecyloxycarbonyl group, heptadecyloxycarbonyl group, octadecyloxy carbonyl group, nonadecyloxycarbonyl group, eicosyloxycarbonyl (icosyloxycarbonyl) group, heneicosyloxycarbonyl (henicosyloxycarbonyl) group, docosyloxycarbonyl group, tricosyloxycarbonyl group, tetracosyloxycarbonyl group, pentacosyloxycarbonyl group, hexacosyloxycarbonyl group, heptacosyloxycarbonyl group, octacosyloxycarbonyl group, nonacosyloxycarbonyl group or triacontyloxycarbonyl group. $R_{17}$ is preferably an alkyl group, alkoxy group or alkoxycarbonyl group having 3 to 12 carbon atoms.

The triphenylene compound (II) represented by general formula (2) can be produced according to, for example, a method as indicated in the following formulas (see Chem. Mater. 2000, 12, 782-789; J. Mater. Chem. 1993, 3, 241-245; J. Am. Chem. Soc. 2004, 126, 1161-1167; Chem. Mater. 2000, 12, 782-789; Synthesis 1981, 396-397; J. Am. Chem. Soc. 1998, 120, 2908-2918; Tetrahedron Lett. 1993, 34, 1639-1642).

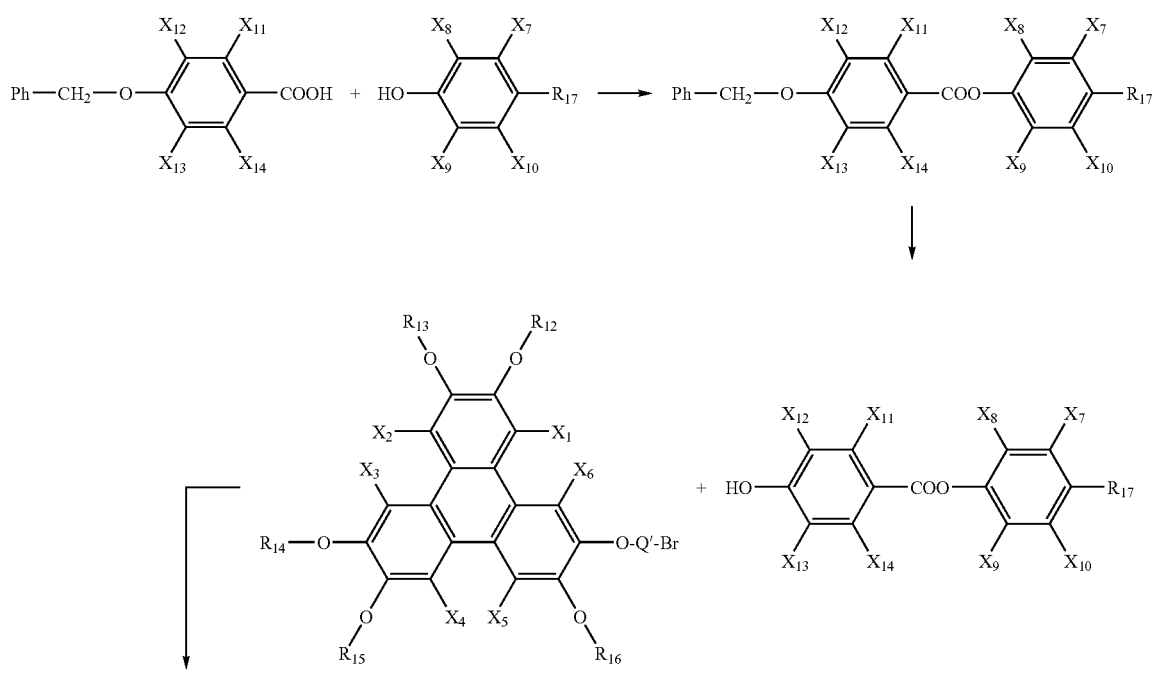

-continued

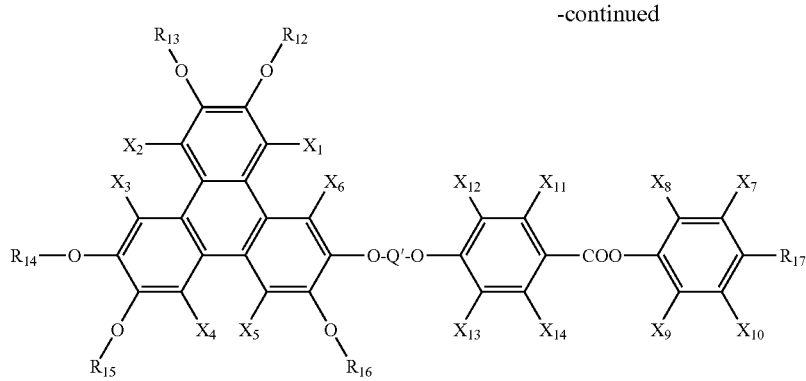

Examples of the triphenylene compound (II) represented by general formula (2) include, but are not limited to, the following compounds.

Nos. 1000 to 1039: (2 or 3)-(chloro or fluoro)-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl or dodecyl)-phenyl ester, namely:

Nos. 1000 to 1009: 2-chloro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl or dodecyl)-phenyl ester, Nos. 1010 to 1019: 2-fluoro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl or dodecyl)-phenyl ester, Nos. 1020 to 1029: 3-chloro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl or dodecyl)-phenyl ester, Nos. 1030 to 1039: 3-fluoro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl or dodecyl)-phenyl ester.

Nos. 1040 to 1439: (2 or 3)-(chloro or fluoro)-4-[4-(3,6,7,10,11-pentabutoxy-triphenylene-2-yloxy)-(pentyl, hexyl, heptyl, octyl, nonyl, decyl, undecyl, dodecyl, tridecyl or tetradecyl)oxy]-benzoic acid 4-(propyl, butyl, pentyl, hexyl, heptyl, octyl, nonyl, decyl, undecyl or dodecyl)-phenyl ester.

Nos. 1440 to 1759: (2 or 3)-(chloro or fluoro)-4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-butoxy]-benzoic acid 4-(propyl, butyl, pentyl, hexyl, heptyl, octyl, nonyl, decyl, undecyl or dodecyl)-phenyl ester.

Nos. 1760 to 2559: (2 or 3)-(chloro or fluoro)-4-[4-(3,6,7,10,11-pentaquis-(pentyl, hexyl, heptyl, octyl, nonyl, decyl, undecyl or dodecyl)oxy-triphenylene-2-yloxy)-(pentyl, hexyl, heptyl, octyl, nonyl, decyl, undecyl, dodecyl, tridecyl or tetradecyl)oxy]-benzoic acid 4-(propyl, butyl, pentyl, hexyl, heptyl, octyl, nonyl, decyl, undecyl or dodecyl)-phenyl ester.

Nos. 2560 to 2599: (2 or 3)-(chloro or fluoro)-4-[4-(3,6,7,10,11-pentabutoxy-triphenylene-2-yloxy)-butoxy]-benzoic acid 4-(4-(propyl, butyl, pentyl, hexyl, heptyl, octyl, nonyl, decyl, undecyl or dodecyl)-phenoxycarbonyl)-phenyl ester.

Nos. 2600 to 2999: (2 or 3)-(chloro or fluoro)-4-[4-(3,6,7,10,11-pentabutoxy-triphenylene-2-yloxy)-(pentyl, hexyl, heptyl, octyl, nonyl, decyl, undecyl, dodecyl, tridecyl or tetradecyl)oxy]-benzoic acid 4-(4-(propyl, butyl, pentyl, hexyl, heptyl, octyl, nonyl, decyl, undecyl or dodecyl)-phenoxycarbonyl)-phenyl ester.

Nos. 3000 to 3399: (2 or 3)-(chloro or fluoro)-4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-butoxy]-benzoic acid 4-(4-(propyl, butyl, pentyl, hexyl, heptyl, octyl, nonyl, decyl, undecyl or dodecyl)-phenoxycarbonyl)-phenyl ester.

Nos. 3400 to 3799: (2 or 3)-(chloro or fluoro)-4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-(pentyl, hexyl, heptyl, octyl, nonyl, decyl, undecyl, dodecyl, tridecyl or tetradecyl)oxy]-benzoic acid 4-(4-(propyl, butyl, pentyl, hexyl, heptyl, octyl, nonyl, decyl, undecyl or dodecyl)-phenoxycarbonyl)-phenyl ester.

Nos. 3800 to 4199: (2 or 3)-(chloro or fluoro)-4-{4-[4-(3,6,7,10,11-pentabutoxy-triphenylene-2-yloxy)-butoxy]-benzoyloxy}-benzoic acid 4-(propyl, butyl, pentyl, hexyl, heptyl, octyl, nonyl, decyl, undecyl or dodecyl)-phenyl ester.

Nos. 4200 to 4599: (2 or 3)-(chloro or fluoro)-4-{4-[4-(3,6,7,10,11-pentabutoxy-triphenylene-2-yloxy)-(pentyl, hexyl, heptyl, octyl, nonyl, decyl, undecyl, dodecyl, tridecyl or tetradecyl)oxy]-benzoyloxy}-benzoic acid 4-(propyl, butyl, pentyl, hexyl, heptyl, octyl, nonyl, decyl, undecyl or dodecyl)-phenyl ester.

Nos. 4600 to 4999: (2 or 3)-(chloro or fluoro)-4-{4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-butoxy]-benzoyloxy}-benzoic acid 4-(propyl, butyl, pentyl, hexyl, heptyl, octyl, nonyl, decyl, undecyl or dodecyl)-phenyl ester.

Nos. 5000 to 5399: (2 or 3)-(chloro or fluoro)-4-{4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-(pentyl, hexyl, heptyl, octyl, nonyl, decyl, undecyl, dodecyl, tridecyl or tetradecyl)oxy]-benzoyloxy}-benzoic acid 4-(propyl, butyl, pentyl, hexyl, heptyl, octyl, nonyl, decyl, undecyl or dodecyl)-phenyl ester.

Nos. 5400 to 5799: (2 or 3)-(chloro or fluoro)-4-[4-(3,6,7,10,11-pentabutoxy-triphenylene-2-yloxy)-(butyryl, pentanoyl, hexanoyl, heptanoyl, octanoyl, nonanoyl, decanoyl, undecanoyl or dodecanoyl)oxy]-benzoic acid 4-(4-propyl, butyl, pentyl, hexyl, heptyl, octyl, nonyl, decyl, undecyl or dodecyl)-phenoxycarbonyl)-phenyl ester.

Nos. 5800 to 6199: (2 or 3)-(chloro or fluoro)-4-[4-(3,6,7,10,11-pentaquis-(pentyl, hexyl, heptyl, octyl, nonyl, decyl, undecyl, dodecyl, tridecyl or tetradecyl)oxy-triphenylene-2-yloxy)-(butyryl, pentanoyl, hexanoyl, heptanoyl, octanoyl, nonanoyl, decanoyl, undecanoyl or dodecanoyl)oxy]-benzoic acid 4-(4-propyl, butyl, pentyl, hexyl, heptyl, octyl, nonyl, decyl, undecyl or dodecyl)-phenoxycarbonyl)-phenyl ester.

In addition, a liquid crystal device using a liquid crystal alignment film composition of the present invention can be produced by producing a display cell, having a prescribed distance between electrode surfaces due to the presence of a spacer, by immersing a glass substrate or plastic substrate provided with ITO or other electrode in a liquid crystal alignment composition as described above, followed by forming an alignment film on the ITO by washing and drying the substrate, and arranging the electrode surfaces in mutual opposition, and injecting a liquid crystal composition containing a triphenylene compound (II) represented by general formula (2) and a chiral agent. A known composition can be used for the liquid crystal composition. Any liquid crystal composition having different dielectric anisotropy (having positive, negative or 0 dielectric constant) can be used.

Moreover, a liquid crystal composition can also be used in which a positive or negative dichroic dye is added to a liquid crystal composition containing a triphenylene compound (II) represented by general formula (2) and a chiral agent. The use of a positive or negative dichroic dye makes it possible to display corresponding to the color tone of the respective dichroic dye in a bistable planar alignment and homeotropic alignment. A known dichroic dye can be used for the positive or negative dichroic dye.

The liquid crystal device of the present invention can be used in various forms as a display apparatus in which that liquid crystal device accounts for all or a portion thereof.

As examples thereof, the liquid crystal device of the present invention can be used as various types of reward cards and membership cards by composing all or a portion of small cards in the manner of business cards or credit cards to produce cards capable of displaying information. Display apparatuses can also be produced in the form of alternative displays of display devices and recording paper (such as the output from photocopiers and printers) used in ordinary offices by increasing the size of these small cards having superior portability. In the case of using a memory-effect liquid crystal device having bistability as a liquid crystal device of such a display apparatus, displays can be maintained without consuming electrical power, thereby making this display apparatus superior from the viewpoints of resource conservation and energy conservation. In addition, incorporating the liquid crystal device of the present invention in various types of articles including home appliances makes it possible to provide information in place of conventional liquid crystal monitors. Moreover, the liquid crystal device of the present invention can also be used in applications such as various types of advertisements and billboards. In this case as well, although the liquid crystal device can compose the entirety thereof, effective displays can also be realized by incorporating in only a portion of, for example, a poster. In addition, the liquid crystal device of the present invention is also able to impart flexibility to media by composing a substrate and the like, thereby enabling it to accommodate an extremely wide range of applications without being subjected to restrictions on shape in various applications such as the cards, sheets, displays, billboards or advertisements described above.

EXAMPLES

The following provides a detailed explanation of the present invention through Examples.

Synthesis Examples

Synthesis of 1,2-bis(hexyloxy)-4-iodobenzene 69.3 g (253 mmol) of iodine, 32.8 g (144 mmol) of periodic acid, 150 mL of distilled water and 22.5 mL of concentrated sulfuric acid were added to 750 mL of glacial acetic acid and stirred for 5 minutes at room temperature followed by the addition of 80.00 g (287 mmol) of 1,2-dihexyloxybenzene and stirring for 24 hours at 40° C. The resulting reaction mixture was cooled to room temperature, washed with aqueous KOH solution (1 M, 1.5 L) and 3 L of distilled water, and then extracted with 800 mL of chloroform. The organic phase was dried with $MgSO_4$ followed by distilling off the solvent. The residue was purified by column chromatography followed by distilling to obtain 218.6 g of a light brown liquid.

Synthesis of 3,4,3',4'-tetraquishexyloxybiphenyl

A mixture consisting of 1200 mL of distilled water/acetone (1/1), 194 g of Pd/C (Pd: 10%), 194 g of Zn powder and 200 g (495 mmol) of 1,2-bishexyloxy-4-iodobenzene was stirred for 24 hours at 50° C. The resulting reaction mixture was filtered with a glass filter and extracted with chloroform. The organic phase was washed with distilled water and dried with $MgSO_4$. The solvent was then distilled off to obtain 123 g of a yellow solid. Recrystallization from ethanol yielded 58.5 g of a white solid.

Synthesis of 2-hexyloxyphenol

A mixture consisting of 740 mL of methyl ethyl ketone, 120 g (1.09 mol) of catechol, 178 g (1.09 mmol) of 1-bromohexane and 211 g (1.53 mol, 1.4 eq.) of potassium carbonate was refluxed for 25 hours. After cooling, the mixture was filtered followed by distilling off the solvent. 202 g of residue was purified by silica gel column chromatography followed by distillation to obtain 101 g of a clear liquid.

Synthesis of 1-(16-bromohexadecyl)-2-hexyloxybenzene 12.8 g (66 mmol) of 2-hexyloxyphenol, 23.3 g (73 mmol) of 16-bromohexadecan-1-ol and 20.0 g (99 mmol) of tri-n-butylphosphine were added to 350 mL of dehydrated methylene chloride followed by cooling with ice in the presence of argon. After adding 25.0 g (99 mmol) of 1,1'-(azodicarbonyl)dipiperidine a little at a time while stirring, 150 mL of methylene chloride were added. After stirring for 30 minutes at room temperature in the presence of argon, the reaction solution was refluxed for 6 hours. After cooling, the reaction solution was dropped into 100 mL of hexane and filtered. The filtrate was concentrated and purified by silica gel column chromatography to obtain 26.5 g of a clear liquid.

Synthesis of 2-(16-bromohexadecyl)-3,6,7,10,11-pentaquishexyloxy triphenylene 5.70 g (10 mmol) of 3,3',4,4'-tetraquishexyloxybiphenyl and 15.3 g (31 mmol) of 1-(16-bromohexadecyl)-2-hexyloxybenzene were dissolved in 40 mL of methylene chloride followed by the addition of 10.0 g (62 mmol) of $FeCl_3$ in the presence of argon and stirring for 3 hours at room temperature. The resulting reaction mixture was dropped into 800 mL of methanol and filtered to obtain 102 g of a solid. The resulting solid was purified by silica gel column chromatography to obtain a yellow solid. Recrystallization from ethanol yielded 8.2 g of a white solid.

Synthesis of [16-(3,6,7,10,11-pentaquishexyloxytriphenylene-2-yloxy)-hexadecyl]-phosphonic acid diethyl ester 20 mL of triethyl phosphite was added to 6.1 g (5.8 mmol) of 2-(16-bromohexadecyl)-3,6,7,10,11-pentaquishexyloxytriphenylene in the presence of argon followed by stirring for 27 hours at 150° C. The excess triethyl phosphite was distilled off and the residue was purified by silica gel column chromatography to obtain 5.4 g of a white solid.

Synthesis of [16-(3,6,7,10,11-pentaquishexyloxytriphenylene-2-yloxy)-hexadecyl]-phosphonic acid (compound (I) Equivalent to oxy-oxy form of the Above-mentioned Nos. 53 to 56)

Figure 16:
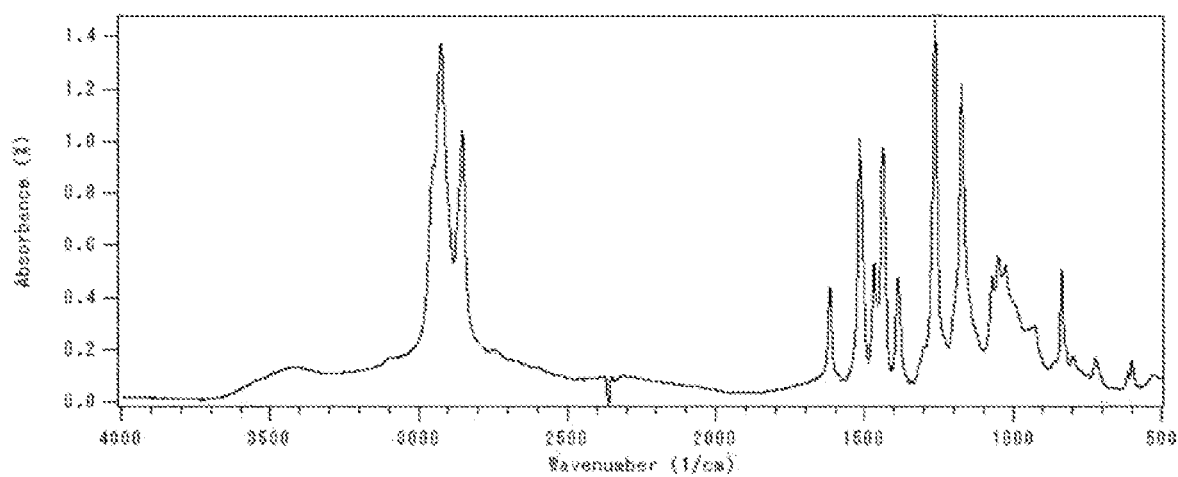
FIG. 16 is a chart of the IR spectrum of [16-(3,6,7,10,11-pentaquis-hexyloxytriphenylene-2-yloxy)-hexadecyl]-phosphonic acid used in Examples.

2.0 g (1.8 mmol) of [16-(3,6,7,10,11-pentaquishexyloxytriphenylene-2-yloxy)-hexadecyl]-phosphonic acid diethyl ester was dissolved in 15 mL of methylene chloride followed by the addition of 1.2 mL of trimethylsilyl bromide in the presence of argon and stirring at room temperature. After stirring for 27 hours, the solvent and the excess trimethylsilyl bromide were distilled off, and the residue was dissolved in 100 mL of ethanol. After stirring for 48 hours at room temperature, the solvent was distilled off to obtain 1.9 g of a white solid. The melting point Mp was 57° C. to 58° C. The molecular weight MS m/z as determined by the MALDI-TOF/MS method was 1048 (calculated value: $C_{64}H_{105}O_9P$, 1048.75). A chart of the IR spectrum of this phosphonic acid ester is shown in FIG. 16.

Synthesis of 2-chloro-4-hydroxy-benzoic acid ethyl ester

A solution consisting of 34.5 g (200 mmol) of 2-chloro-4-hydroxy-benzoic acid, 5 mL of concentrated sulfuric acid and 400 mL of ethanol was refluxed for 18 hours. 1.2 L of water were added to the resulting mixture followed by extraction with 1.5 L of methylene chloride. The mixture was then washed with aqueous sodium bicarbonate solution and water and dried with magnesium sulfate followed by distilling off the solvent. The residue was recrystallized from hexane/ethyl acetate to obtain 20.4 g of a light orange solid.

Synthesis of 4-benzyloxy-2-chloro-benzoic acid ethyl ester 16.76 g (83.5 mmol) of 2-chloro-4-hydroxy-benzoic acid ethyl ester and 23.1 g (167 mmol) of potassium carbonate were added to 100 mL of methyl ethyl ketone followed by the addition of 17.1 g (100 mmol) of bromomethylbenzene while stirring. After refluxing for 28 hours, the mixture was cooled and filtered. The filtrate was concentrated and the residue was purified by silica gel column chromatography to obtain 21.1 g of a light yellow solid.

Synthesis of 4-benzyloxy-2-chloro-benzoic acid 17.7 g (60.9 mmol) of 4-benzyloxy-2-chloro-benzoic acid ethyl ester and 4.87 g (122 mmol) of sodium hydroxide were added to a mixed solvent consisting of 180 mL of methanol and 18 mL of water followed by refluxing for 6 hours. After cooling, concentrated hydrochloric acid was added to bring to a pH of 5 followed by filtering out the precipitate. The precipitate was washed with water and dried to obtain 8.5 g of a white solid.

Synthesis of 4-benzyloxy-benzoic acid 4-pentyl-phenyl ester 12.6 g (55.0 mmol) of 4-benzyloxy-benzoic acid, 8.2 g (50.0 mmol) of 4-pentylphenol and 0.61 g (5.0 mmol) of 4-dimethylaminopyridine were added to 150 mL of methylene chloride followed by the addition of 11.4 g (55.0 mmol) of dicyclohexylcarbodiimide while stirring in the presence of argon. After stirring for 6 hours in the presence of argon, the mixture was filtered followed by concentrating the filtrate. The residue was purified by silica gel column chromatography to obtain 18.7 g of a white solid.

Synthesis of 4-hydroxy-benzoic acid 4-pentyl-phenyl ester 15.6 g (41.5 mmol) of 4-benzyloxy-benzoic acid 4-pentyl-phenyl ester, 25 mL of cyclohexane and 0.78 g of palladium hydroxide/carbon were added to 100 mL of dehydrated ethanol and refluxed for 10 hours in the presence of argon. The resulting reaction mixture was filtered and the filtrate was concentrated. The residue was recrystallized from toluene to obtain 11.0 g of a white solid.

Synthesis of 4-benzyloxy-2-chloro-benzoic acid 4-(4-pentyl-phenoxycarbonyl)-phenyl ester 1.84 g (7.0 mmol) of 4-benzyloxy-2-chloro-benzoic acid, 1.90 g (6.7 mmol) of 4-hydroxy-benzoic acid 4-pentyl-phenyl ester and 0.082 g (0.67 mmol) of 4-dimethylaminopyridine were dissolved in 50 mL of methylene chloride followed by the addition of 1.45 g (7.0 mmol) of dicyclohexylcarbodiimide while stirring in the presence of argon. After stirring for 8 hours in the presence of argon, the reaction mixture was filtered and the filtrate was concentrated. The residue was purified by silica gel column chromatography to obtain 3.3 g of a white solid.

Synthesis of 2-chloro-4-hydroxy-benzoic acid 4-(4-pentyl-phenoxycarbonyl)-phenyl ester 2.5 g (4.7 mmol) of 4-benzyloxy-2-chloro-benzoic acid 4-(4-pentyl-phenoxycarbonyl)-phenyl ester, 20 mL of cyclohexane and 0.13 g of palladium hydroxide/carbon were added to 25 mL of dehydrated ethanol and refluxed for 12 hours in the presence of argon. The resulting reaction mixture was filtered and the filtrate was concentrated. The residue was recrystallized from hexane/ethyl acetate to obtain 1.65 g of a white solid.

Synthesis of 2-chloro-4-[9-(3,6,7,10,11-pentaquis-hexyloxy-triphenylene-2-yloxy)-nonanoyloxy]-benzoic acid 4-(4-pentyloxy-phenoxycarbonyl)-phenyl ester (Compound (II) of the Above-mentioned No. 3125)

Figure 17:
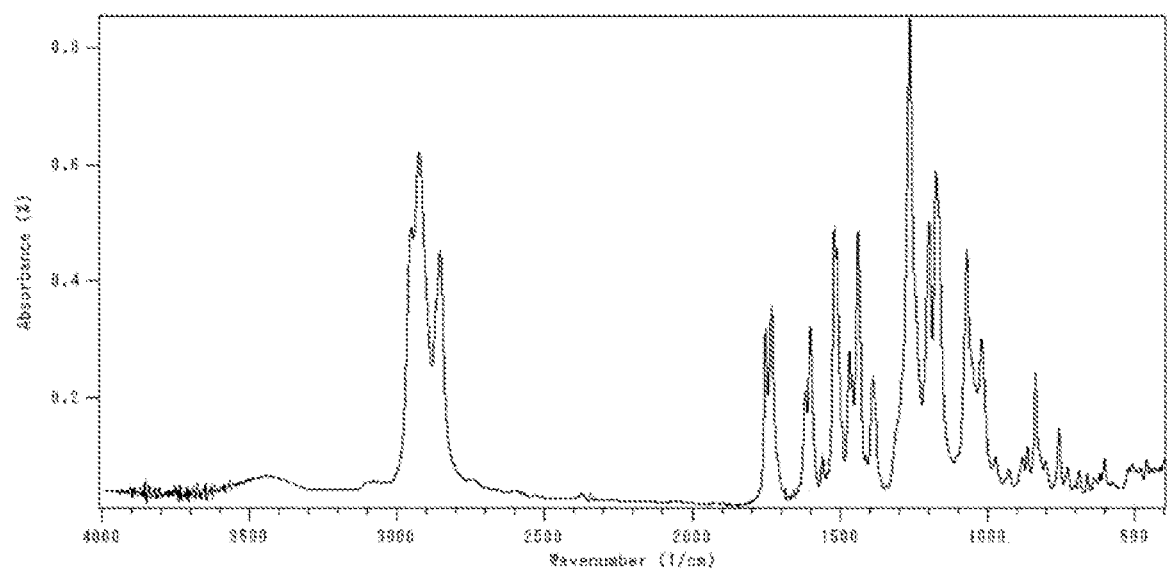
FIG. 17 is a chart of the IR spectrum of 2-chloro-4-[9-(3,6,7,10,11-pentaquis-hexyloxy-triphenylene-2-yloxy)-nonanoyloxy]-benzoic acid 4-(4-pentyloxy-phenoxycarbonyl)-phenyl ester used in Examples.

0.70 g (0.78 mmol) of 9-(3,6,7,10,11-pentaquis-hexyloxy-triphenylene-2-yloxy)-nonanoic acid, 0.34 g (0.78 mmol) of 2-chloro-4-hydroxy-benzoic acid 4-(4-pentyl-phenoxycarbonyl)-phenyl ester and 0.009 g (0.08 mmol) of 4-dimethylaminopyridine were dissolved 20 mL of methylene chloride followed by the addition of 0.16 g (0.78 mmol) of dicyclohexylcarbodiimide while stirring in the presence of argon. After stirring for 22 hours in the presence of argon, the reaction mixture was filtered and the filtrate was concentrated. The residue was purified by silica gel column chromatography to obtain 0.44 g of a white solid. The melting point Mp was 55° C. The molecular weight MS m/z as determined by the APCI method was 283 (−), 1010 (+), 1028 (+) (calculated value: $C_{81}H_{109}ClO_{11}$, 1292.77). A chart of the IR spectrum of this compound is shown in FIG. 17.

Example 1

Two glass substrates provided with an ITO film and having a thickness of 1.1 mm (Super ITO-A, ITO layer thickness: approx. 100 nm, Ulvac, Inc.) were prepared, and after immersing in a solution consisting of aqueous hydrogen peroxide (approx. 30%), aqueous ammonia (approx. 30%) and ion exchange water (mixed at a ratio of 1:1:5, respectively), the substrates were subjected to ultrasonic treatment for about 15 minutes and then immersed in the same solution for 60 minutes at 60° C. to wash the ITO surface.

Preparation of Liquid Crystal Alignment Film Composition 10.5 mg of the [16-(3,6,7,10,11-pentaquishexyloxytriphenylene-2-yloxy)-hexadecyl-phosphonic acid obtained in the synthesis examples (wherein, $R_1$ to $R_5$ represent hexyl groups in general formula (1), $R_6$ represents a hexadecylene group and $R_7$ represents —P(=O)(OH)$_2$) were dissolved in 10 mL of ethanol to prepare an alignment film composition. The two washed glass substrates provided with an ITO film were immersed in the resulting alignment film composition followed by subjecting to ultrasonic treatment for about 15 minutes at room temperature and allowing to stand in the same solution at 20° C. 24 hours later, the substrates were taken out of the solution, adequately washed with ion exchange water and dried by blowing with air (room temperature) followed by adequately washing with methanol and drying by blowing with air (room temperature) to provide an alignment film on the ITO side.

Production of Display Cell and Liquid Crystal Device

Next, the above-mentioned two glass substrates provided with an ITO film with an alignment film provided thereon were arranged so that the mutual electrode sides thereof were in opposition (oppositional arrangement), and then composed so as to form an internal space having a distance between the electrode sides of about 18 μm by providing a plastic film spacer therebetween to produce a display cell.

The fabricated display cell was filled with a liquid crystal composition MLC-6610 (Merck Japan, Ltd.), and after heating to a temperature at which the liquid crystal composition demonstrates an isotropic phase, was cooled to room temperature and the gap was sealed with an adhesive to produce a liquid crystal display device.

Evaluation of Alignment Characteristics

The results of observing a conoscopic image of the liquid crystal display device produced in the manner described above using a polarizing microscope are shown in FIG. 1. The liquid crystal is indicated as being vertically aligned if the intersection of the crosshairs within the circle are located in the center of the circle. If the intersection of the crosshairs is not in the center of the circle, it indicates that the liquid crystal is tilted, and the degree to which it is tilted increases the greater the distance of the intersection of the crosshairs from the center of the circle. As shown in FIG. 1, the liquid crystal composition obtained in Example 1 can be seen to be vertically aligned with respect to the substrate surface. In addition, since similar results were obtained for other conoscopic images observed at all portions regardless of the location, the liquid crystal was determined to be aligned evenly and homogeneously. Namely, the liquid crystal composition obtained in Example 1 was determined to demonstrate a so-called homeotropic alignment in which it is uniformly vertically aligned with respect to the substrate surface.

Example 2

Figure 2:
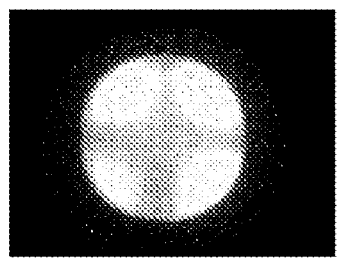
FIG. 2 is a conoscopic image of a liquid crystal device obtained in Example 2.

A liquid crystal alignment film composition was prepared and a display cell and liquid crystal device were produced in the same manner as Example 1 with the exception of using RDP-95407 (Dainippon Ink and Chemicals, Inc.) for the liquid crystal composition, followed by evaluation of the alignment characteristics thereof. The results of observing a conoscopic image thereof are shown in FIG. 2. The liquid crystal composition was uniformly homeotropically aligned with respect to the substrate surface.

Example 3

Figure 3:
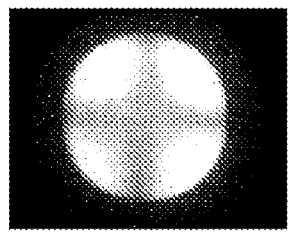
FIG. 3 is a conoscopic image of a liquid crystal device obtained in Example 3.

A liquid crystal alignment film composition was prepared in the same manner as Example 1 with the exception of using a solution in which 10.5 mg of [16-(3,6,7,10,11-pentaquishexyloxytriphenylene-2-yloxy)-hexadecyl]-phosphonic acid and 55.6 mg of tetradecylphosphonic acid were dissolved in 10 mL of ethanol for the liquid crystal alignment film composition, followed by producing a display cell and liquid crystal device and evaluation of the alignment characteristics thereof. The results of observing a conoscopic image thereof are shown in FIG. 3. The liquid crystal composition was uniformly homeotropically aligned with respect to the substrate surface.

Example 4

Figure 4:
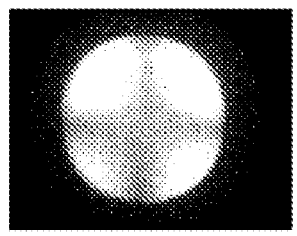
FIG. 4 is a conoscopic image of a liquid crystal device obtained in Example 4.

A liquid crystal alignment film composition was prepared and a display cell and liquid crystal device were produced in the same manner as Example 3 with the exception of using RDP-95407 (Dainippon Ink and Chemicals, Inc.) for the liquid crystal composition, followed by evaluation of the alignment characteristics thereof. The results of observing a conoscopic image thereof are shown in FIG. 4. The liquid crystal composition was uniformly homeotropically aligned with respect to the substrate surface.

Example 5

Figure 5:
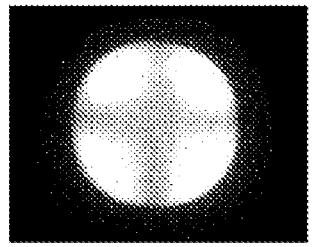
FIG. 5 is a conoscopic image of a liquid crystal device obtained in Example 5.

A liquid crystal display device was produced in the same manner as Example 1 with the exception of using a solution in which 10.5 mg of [16-(3,6,7,10,11-pentaquishexyloxytriphenylene-2-yloxy)-hexadecyl]-ph osphonic acid and 41.7 mg of tetradecylphosphonic acid were dissolved in 10 mL of ethanol for the liquid crystal alignment film composition, and using a mixture (9/1 weight ratio) of RDP-95407 (Dainippon Ink and Chemicals, Inc.) and liquid crystal composition MX-001543 (Merck Japan, Ltd.) for the liquid crystal composition, followed by evaluation of the alignment characteristics thereof. The results of observing a conoscopic image thereof are shown in FIG. 5. The liquid crystal composition was determined to demonstrate a so-called homeotropic alignment in which it was uniformly vertically aligned with respect to the substrate surface.

Example 6

Figure 6:
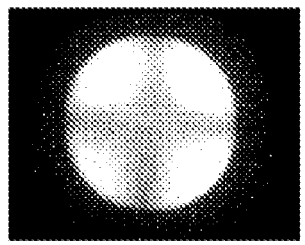
FIG. 6 is a conoscopic image of a liquid crystal device obtained in Example 6.

A liquid crystal alignment film composition was prepared and a display cell and liquid crystal device were produced in the same manner as Example 5 with the exception of using a solution in which 10.5 mg of [16-(3,6,7,10,11-pentaquishexyloxytriphenylene-2-yloxy)-hexadecyl]-tri(chloro, methoxy or ethoxy) silane and 55.6 mg of tetradecyltri (chloro, methoxy or ethoxy) silane were dissolved in 10 mL of ethanol for the liquid crystal alignment film composition, followed by evaluation of the alignment characteristics thereof. The results of observing a conoscopic image thereof are shown in FIG. 6. The liquid crystal composition was uniformly homeotropically aligned with respect to the substrate surface.

Example 7

Figure 7:
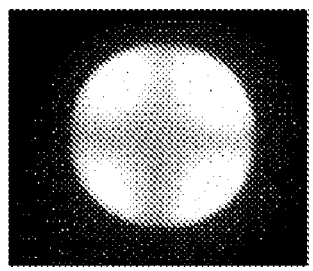
FIG. 7 is a conoscopic image of a liquid crystal device obtained in Example 7.

A liquid crystal alignment film composition was prepared and a display cell and liquid crystal device were produced in the same manner as Example 1 with the exception of using a solution in which 5.0 mg of [12-(3,6,7,10,11-pentaquishexyloxytriphenylene-2-yloxy)-dodecyl-phosphonic acid (wherein, $R_1$ to $R_5$ in general formula (1) represent —$C_6H_{13}$, $R_6$ represents —$C_{12}H_{24}$— and $R_7$ represents —P(=O)(OH)$_2$), obtained in the same manner as the [16-(3,6,7,10,11-pentaquishexyloxytriphenylene-2-yloxy)-hexadecyl-phosphonic acid (wherein, $R_1$ to $R_5$ in general formula (1) represent —$C_6H_{13}$, $R_6$ represents —$C_{16}H_{32}$— and $R_7$ represents —P(=O)(OH)$_2$) obtained in the synthesis examples, were dissolved in 10 mL of ethanol, followed by evaluation of the alignment characteristics thereof. The results of observing a conoscopic image thereof are shown in FIG. 7. The liquid crystal composition was uniformly homeotropically aligned with respect to the substrate surface.

Example 8

Production of Display Cell and Liquid Crystal Device

Two glass substrates provided with an ITO film with an alignment film provided thereon produced in the same manner as Example 1 were arranged so that the mutual electrode sides thereof were in opposition (oppositional arrangement), and then composed so as to form an internal space having a distance between the electrode sides of about 16 μm by providing a plastic film spacer there between to produce a display cell.

A liquid crystal composition having a chiral pitch of 19 μm was obtained by dissolving in 1 g of MX-001543 (Merck Japan, Ltd.)33 mg (25 μmol) of the 2-chloro-4-[9-(3,6,7,10,11-pentaquis-hexyloxy-triphenylene-2-yloxy)-nonanoyloxy]-benzoic acid 4-(4-pentyloxy-phenoxycarbonyl)-phenyl ester obtained in the synthesis examples (wherein, $R_{12}$ to $R_{16}$ in general formula (2) represent —$C_6H_{13}$, $R_{17}$ represents —$C_5H_{11}$, n represents 2, $X_1$ to $R_{13}$ and $X_{15}$ to $X_{18}$ represent —H, $X_{14}$ represents —Cl, Q represents —$C_8H_{16}$COO— (wherein the left end is bonded to the triphenylene side), and $Q_1$ and $Q_2$ represent —COO— (wherein the left end is bonded to the triphenylene side)) and 9 mg of a chiral agent CN (Merck Japan, Ltd.), followed by loading into the produced display cell, heating to at least the temperature at which the liquid crystal composition demonstrates an isotropic phase (112° C.), cooling to room temperature and sealing the gap with an adhesive to produce a liquid crystal device.

Evaluation of Alignment Characteristics and Bistability

Figure 8:
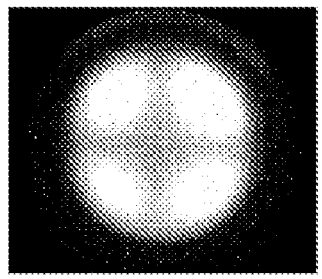
FIG. 8 is a conoscopic image of a liquid crystal device obtained in Example 8.
Figure 9:
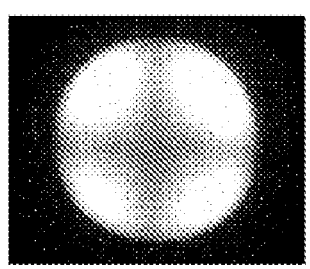
FIG. 9 is a conoscopic image of a liquid crystal device obtained in Example 8.
Figure 10:
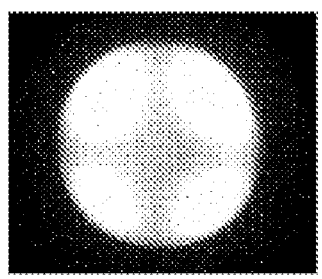
FIG. 10 is a conoscopic image of a liquid crystal device obtained in Example 8.

After repeatedly and alternately applying a voltage of 5 V/1 kHz and 5 V/100 kHz three times to a liquid crystal device produced in the manner described above, a conoscopic image of the liquid crystal device was observed using a polarizing microscope while applying a voltage of 5 V/1 kHz. The results of observing that conoscopic image are shown in FIG. 8. The liquid crystal composition was uniformly homeotropically aligned with respect to the substrate surface. Subsequently, application of the 5V/1 kHz voltage was discontinued and conoscopic images of the liquid crystal device were observed 1 minute and 1 hour later. The resulting conoscopic images are shown in FIG. 9 and FIG. 10, respectively. The homeotropic alignment was determined to be uniformly maintained even in the absence of an applied voltage.

Figure 11:
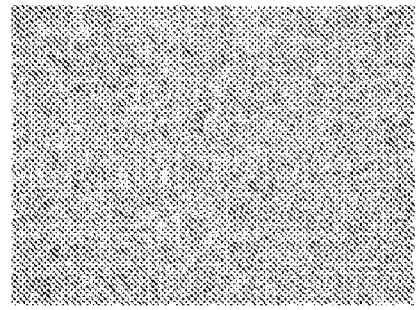
FIG. 11 is an orthoscopic image of a liquid crystal device obtained in Example 8.
Figure 12:
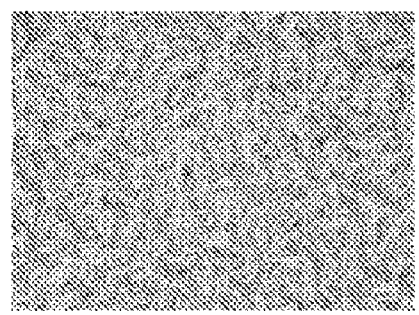
FIG. 12 is an orthoscopic image of a liquid crystal device obtained in Example 8.
Figure 13:
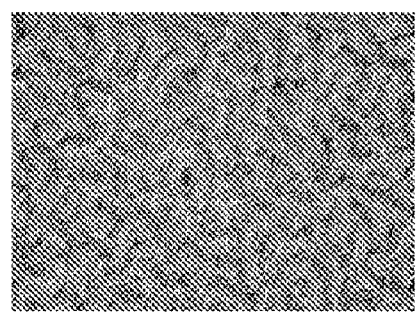
FIG. 13 is an orthoscopic image of a liquid crystal device obtained in Example 8.
Figure 14:
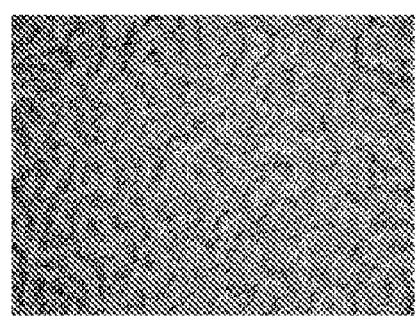
FIG. 14 is an orthoscopic image of a liquid crystal device obtained in Example 8.

Next, after repeatedly and alternately applying a voltage of 5 V/100 kHz and 5 V/1 kHz three times to the same liquid crystal device as described above, an orthoscopic image of the liquid crystal device was observed using a polarizing microscope while applying a voltage of 5 V/100 kHz. The results of observing that orthoscopic image are shown in FIG. 11. The liquid crystal composition was uniformly aligned in parallel with respect to the substrate surface, demonstrating a so-called planar alignment. Subsequently, application of the 5V/100 kHz voltage was discontinued and orthoscopic images of the liquid crystal device were observed 1 minute, 1 hour and 24 hours later. The resulting conoscopic images are shown in FIG. 12, FIG. 13 and FIG. 14, respectively. The planar alignment was determined to be uniformly maintained even in the absence of an applied voltage.

Accordingly, the liquid crystal device as described above was clearly determined to be a bistable liquid crystal device capable of maintaining a homeotropic alignment and planar alignment in the absence of an applied voltage.

Example 9

Production of Display Cell and Liquid Crystal Device

A liquid crystal alignment film composition was prepared and a display cell was produced in the same manner as Example 1 with the exception of using a solution in which 5.0 mg of [8-(3,6,7,10,11-pentaquishexyloxytriphenylene-2-yloxy)-octyl-phosphonic acid (wherein, $R_1$ to $R_5$ in general formula (1) represent —$C_6H_{13}$, $R_6$ represents —$C_8H_{16}$— and $R_7$ represents —P(=O)(OH)$_2$), obtained in the same manner as the [16-(3,6,7,10,11-pentaquishexyloxytriphenylene-2-yloxy)-hexadecyl-phosphonic acid (wherein, $R_1$ to $R_5$ in general formula (1) represent —$C_6H_{13}$, $R_6$ represents —$C_{16}H_{32}$— and $R_7$ represents —P(=O)(OH)$_2$) obtained in the synthesis examples, is dissolved in 10 mL of ethanol.

A liquid crystal composition having a chiral pitch of 19 µm was obtained by dissolving in 1 g of RDP-95407 (Dainippon Ink and Chemicals, Inc.) 65 mg (50 µmol) of 2-chloro-4-{4-[8-(3,6,7,10,11-pentaquis-hexyloxy-triphenylene-2-yloxy)-octyloxy]-benzoyloxy}-benzoic acid 4-pentyl-phenyl ester (wherein, $R_{12}$ to $R_{16}$ in general formula (2) represent —$C_6H_{13}$, $R_{17}$ represents —$C_5H_{11}$, n represents 2, $X_1$ to $X_{17}$ represent —H, $X_{18}$ represents —Cl, Q represents —$C_8H_{16}$O— (wherein the left end is bonded to the triphenylene side), and $Q_1$ and $Q_2$ represent —COO— (wherein the left end is bonded to the triphenylene side)), obtained in the same manner as the 2-chloro-4-[9-(3,6,7,10,11-pentaquis-hexyloxy-triphenylene-2-yloxy)-nonanoyloxy]-benzoic acid 4-(4-pentyl-phenoxycarbonyl)-phenyl ester obtained in the synthesis examples (wherein, $R_{12}$ to $R_{16}$ in general formula (2) represent —$C_6H_{13}$, $R_{17}$ represents —$C_5H_{11}$, n represents 2, $X_1$ to $X_{13}$ and $X_{15}$ to $X_{18}$ represent —H, $X_{14}$ represents —Cl, Q represents —$C_8H_{16}$COO— (wherein the left end is bonded to the triphenylene side), and $Q_1$ and $Q_2$ represent —COO— (wherein the left end is bonded to the triphenylene side)), and 9 mg of a chiral agent CN (Merck Japan, Ltd.), followed by filling into the produced display cell, heating to at least the temperature at which the liquid crystal composition demonstrates an isotropic phase (105° C.), cooling to room temperature and sealing the gap with an adhesive to produce a liquid crystal device.

Evaluation of Alignment Characteristics and Bistability

Figure 18:
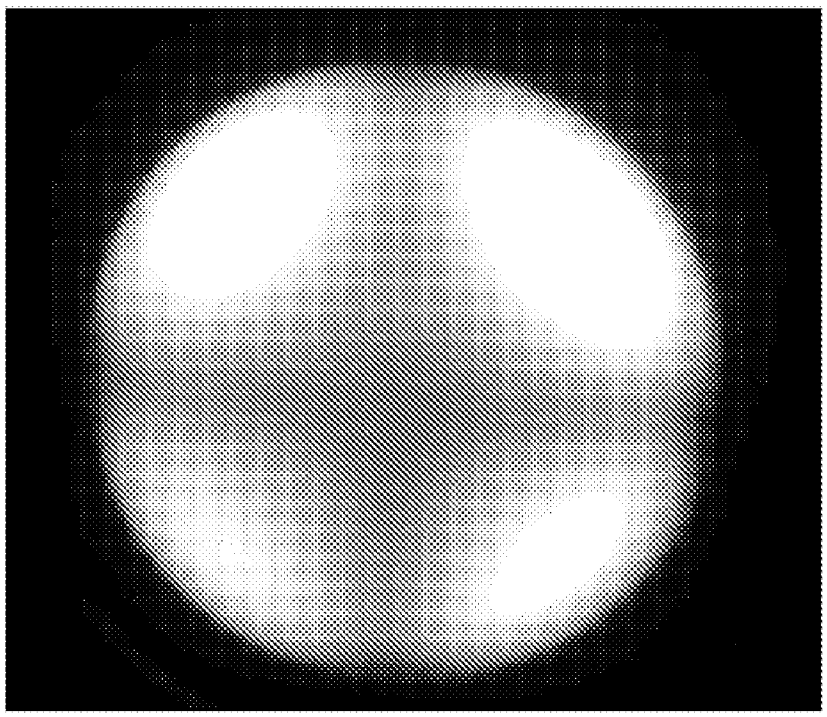
FIG. 18 is a conoscopic image of a liquid crystal device obtained in Example 9.

After repeatedly and alternately applying a voltage of 25 V/1 kHz and 10 V/100 kHz three times to a liquid crystal device produced in the manner described above, a conoscopic image of the liquid crystal device was observed using a polarizing microscope while applying a voltage of 25 V/1 kHz. The liquid crystal composition was uniformly homeotropically aligned with respect to the substrate surface. Subsequently, application of the 25V/1 kHz voltage was discontinued and a conoscopic image of the liquid crystal device was observed 1 hour later. The resulting conoscopic image is shown in FIG. 18. The homeotropic alignment was determined to be uniformly maintained even in the absence of an applied voltage.

Figure 19:
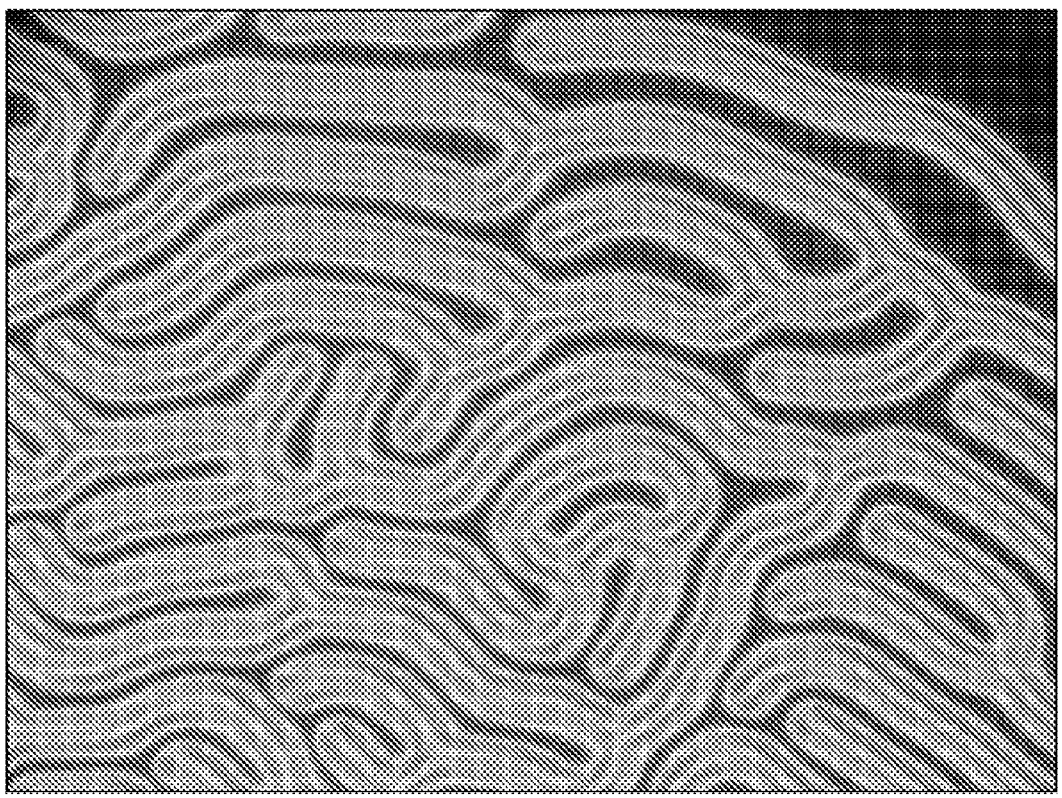
FIG. 19 is an orthoscopic image of a liquid crystal device obtained in Example 9.

Next, after repeatedly and alternately applying a voltage of 25 V/100 kHz and 10 V/1 kHz three times to the same liquid crystal device as described above, an orthoscopic image of the liquid crystal device was observed using a polarizing microscope while applying a voltage of 5 V/100 kHz. The liquid crystal composition was uniformly aligned in parallel with respect to the substrate surface, demonstrating a so-called planar alignment. Subsequently, application of the 5V/100 kHz voltage was discontinued and an orthoscopic image of the liquid crystal device was observed 1 hour later. The resulting conoscopic image is shown in FIG. 19. The planar alignment was determined to be uniformly maintained even in the absence of an applied voltage.

Example 10

Production of Display Cell and Liquid Crystal Device

Two glass substrates provided with an ITO film with a liquid crystal alignment film provided thereon produced in the same manner as Example 1 were arranged so that the mutual electrode sides thereof were in opposition (oppositional arrangement), and then composed so as to form an internal space having a distance between the electrode sides of about 16 µm by providing a plastic film spacer there between to produce a display cell.

A liquid crystal composition having a chiral pitch of 19 μm was obtained by dissolving 1 g of MX-001545 (Merck Japan, Ltd.) 65 mg (50 μmol) of 2-chloro-4-[8-(3,6,7,10,11-pentaquis-hexyloxy-triphenylene-2-yloxy)-octyloxy]-benzoic acid 4-(4-pentyl-phenylcarbonyl)-phenyl ester (wherein, $R_{12}$ to $R_{16}$ in general formula (2) represent —$C_6H_{13}$, $R_{17}$ represents —$C_5H_{11}$, n represents 2, $X_1$ to $X_{13}$ and $X_{15}$ to $X_{18}$ represent —H, $X_{14}$ represents —Cl, Q represents —$C_8H_{16}$O— (wherein the left end is bonded to the triphenylene side), and $Q_1$ and $Q_2$ represent —COO— (wherein the left end is bonded to the triphenylene side)), obtained in the same manner as the 2-chloro-4-[9-(3,6,7,10,11-pentaquis-hexyloxy-triphenylene-2-yloxy)-nonanoyloxy]-benzoic acid 4-(4-pentyl-phenoxycarbonyl)-phenyl ester obtained in the synthesis examples (wherein, $R_{12}$ to $R_{16}$ in general formula (2) represent —$C_6H_{13}$, $R_{17}$ represents —$C_5H_{11}$, n represents 2, $X_1$ to $X_{13}$ and $X_{15}$ to $X_{18}$ represent —H, $X_{14}$ represents —Cl, Q represents —$C_8H_{16}$COO— (wherein the left end is bonded to the triphenylene side), and $Q_1$ and $Q_2$ represent —COO— (wherein the left end is bonded to the triphenylene side)) and 9 mg of a chiral agent CN (Merck Japan, Ltd.), followed by loading into the produced display cell, heating to at least the temperature at which the liquid crystal composition demonstrates an isotropic phase (115° C.), cooling to room temperature and sealing the gap with an adhesive to produce a liquid crystal device.

Evaluation of Alignment Characteristics and Bistability

Figure 20:
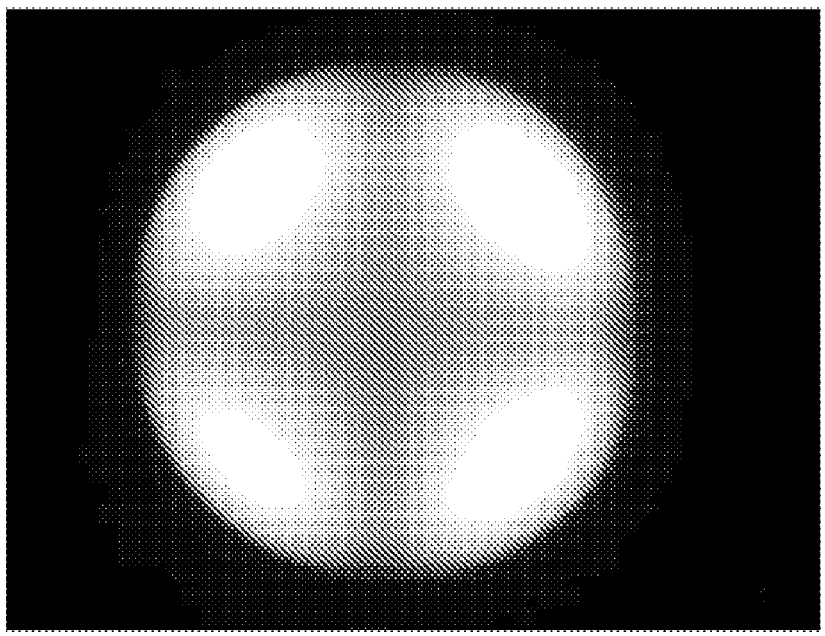
FIG. 20 is a conoscopic image of a liquid crystal device obtained in Example 10.

After repeatedly and alternately applying a voltage of 10 V/1 kHz and 10 V/100 kHz three times to a liquid crystal device produced in the manner described above, a conoscopic image of the liquid crystal device was observed using a polarizing microscope while applying a voltage of 10 V/1 kHz. The liquid crystal composition was uniformly homeotropically aligned with respect to the substrate surface. Subsequently, application of the 10 V/1 kHz voltage was discontinued and a conoscopic image of the liquid crystal device was observed 1 hour later. The resulting conoscopic image is shown in FIG. 20. The homeotropic alignment was determined to be uniformly maintained even in the absence of an applied voltage.

Figure 21:
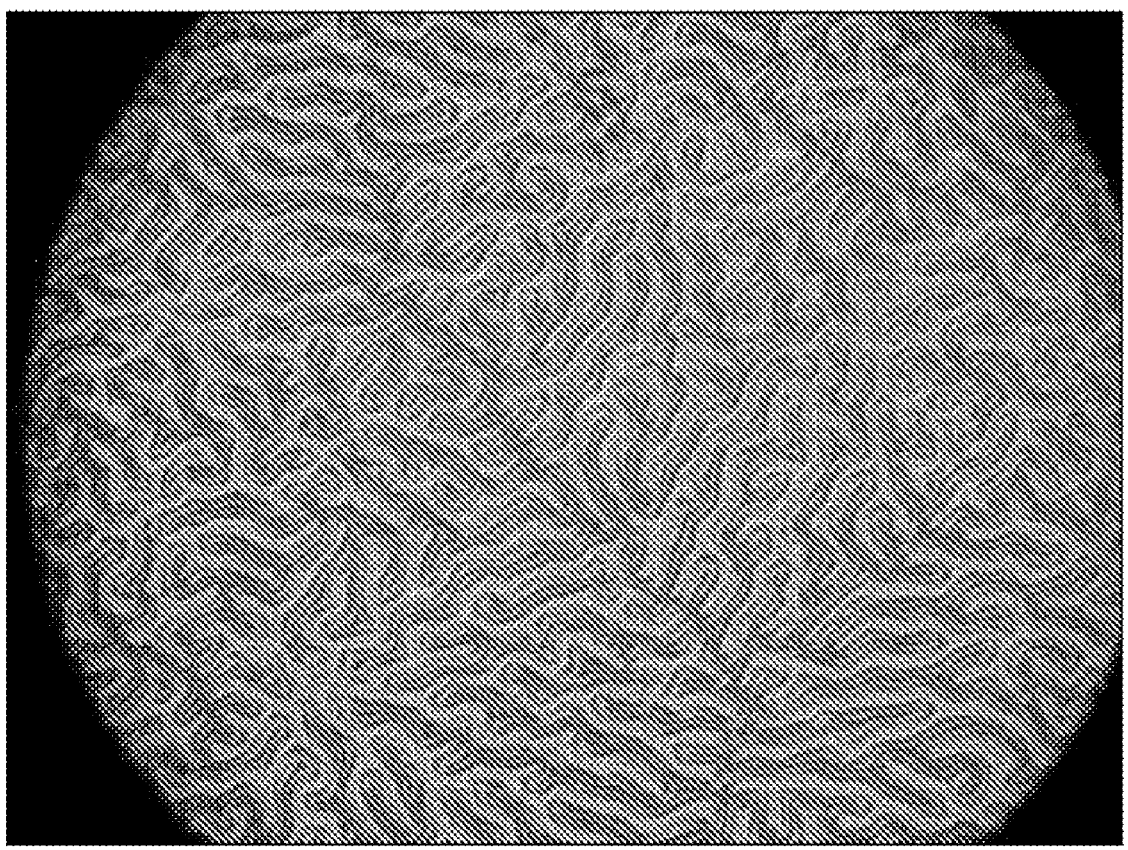
FIG. 21 is an orthoscopic image of a liquid crystal device obtained in Example 10.

Next, after repeatedly and alternately applying a voltage of 10 V/100 kHz and 10 V/1 kHz three times to the same liquid crystal device as described above, an orthoscopic image of the liquid crystal device was observed using a polarizing microscope while applying a voltage of 10 V/100 kHz. The liquid crystal composition was uniformly aligned in parallel with respect to the substrate surface, demonstrating a so-called planar alignment. Subsequently, application of the 10 V/100 kHz voltage was discontinued and an orthoscopic image of the liquid crystal device was observed 1 hour later. The resulting conoscopic image is shown in FIG. 21. The planar alignment was determined to be uniformly maintained even in the absence of an applied voltage.

Accordingly, the liquid crystal device as described above was clearly determined to be a bistable liquid crystal device capable of maintaining a homeotropic alignment and planar alignment in the absence of an applied voltage.

Example 11

Production of Liquid Crystal Device

A liquid crystal device was produced in the same manner as Example 8 with the exception of using a liquid crystal composition prepared by dissolving 0.8% by weight of a dichroic dye S-416 (Mitsui Toatsu Chemicals, Inc.) in the liquid crystal composition used in Example 8.

Evaluation of Reflectance

Figure 22:
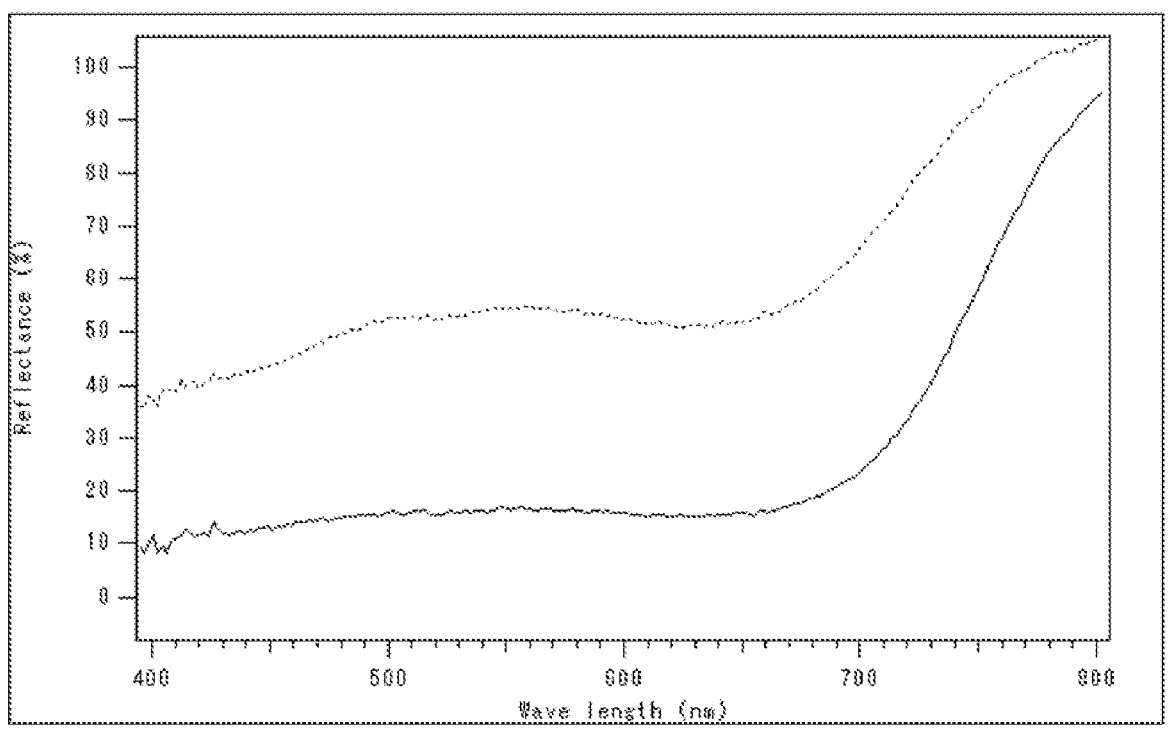
FIG. 22 is a graph showing the reflectance of a liquid crystal device obtained in Example 11.

After repeatedly and alternately applying a voltage of 10 V/1 kHz and 10 V/100 kHz three times to a liquid crystal device produced in the manner described above, the liquid crystal composition was confirmed to be uniformly homeotropically aligned using a polarizing microscope while applying a voltage of 10 V/1 kHz. Subsequently, application of the 10 V/1 kHz voltage was discontinued, and reflected light of the display medium was measured based on a reflectance of 100% for a standard white plate over the wavelength region of 400 nm to 800 nm according to light radiated at a 45 degree angle and received perpendicularly using the Photal MCPD-1000 manufactured by Otsuka Electronics Co., Ltd. Those results are shown in FIG. 22 (dotted line).

Next, after repeatedly and alternately applying a voltage of 10 V/1 kHz and 10 V/100 kHz three times, the liquid crystal composition was confirmed to uniformly demonstrate a planar alignment using a polarizing microscope while applying a voltage of 10 V/100 kHz. Subsequently, application of the 10 V/100 kHz voltage was discontinued, and reflected light of the display medium was measured based on a reflectance of 100% for a standard white plate over the wavelength region of 400 nm to 800 nm according to light radiated at a 45 degree angle and received perpendicularly using the Photal MCPD-1000 manufactured by Otsuka Electronics Co., Ltd. Those results are shown in FIG. 22 (solid line).

Accordingly, the liquid crystal device described above was clearly determined to be able to be used as a display apparatus.

What is claimed is:
1. A liquid crystal alignment film composition comprising: one type of triphenylene compound (I) represented by the following general formula (1):

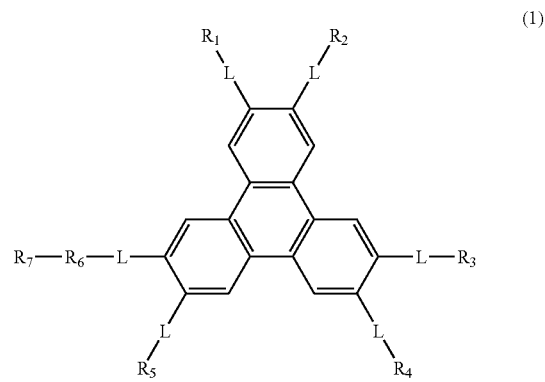

wherein L represents —O— or —S—, $R_1$, $R_2$, $R_3$, $R_4$ and $R_5$ are identical or different and represent a hydrocarbon group having four or more carbon atoms, $R_6$ represents a divalent hydrocarbon group having four or more carbon atoms, $R_7$ represents —$SiR_8R_9R_{10}$ or —$P(=O)(OH)_2$, and $R_8$, $R_9$ and $R_{10}$ are identical or different and represent —Cl, —OH, —$OCH_3$ or —$OC_2H_5$.

2. The liquid crystal alignment film composition according to claim 1, wherein the liquid crystal alignment film composition comprises the triphenylene compound (I) represented by the general formula (1) and a compound (A) represented by the general formula $R_{11}$—$R_7$, wherein $R_{11}$ is a linear hydrocarbon group having four or more carbon atoms and $R_7$ represents —$SiR_8R_9R_{10}$ or —$P(=O)(OH)_2$.

3. A liquid crystal device comprising: a liquid crystal alignment film, wherein the liquid crystal alignment film composition comprises one type of triphenylene compound (I) represented by the following general formula (1):

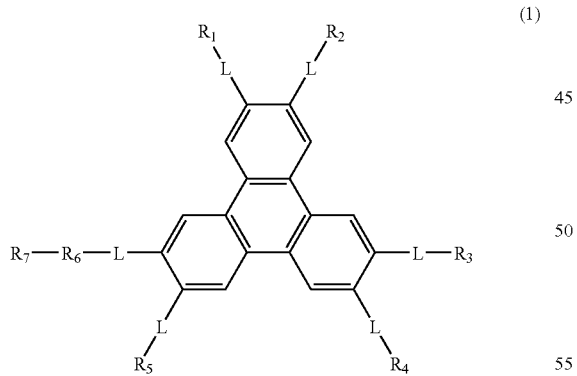

(1)

wherein L represents —O— or —S—, $R_1$, $R_2$, $R_3$, $R_4$ and $R_5$ are identical or different and represent a hydrocarbon group having four or more carbon atoms, $R_6$ represents a divalent hydrocarbon group having four or more carbon atoms, $R_7$ represents —$SiR_8R_9R_{10}$ or —$P(=O)(OH)_2$, and $R_8$, $R_9$ and $R_{10}$ are identical or different and represent —Cl, —OH, —$OCH_3$ or —$OC_2H_5$.

4. The liquid crystal device according to claim 3, wherein the liquid crystal device further uses a liquid crystal composition which comprises one type of triphenylene compound (II) represented by the following general formula (2) and a chiral agent:

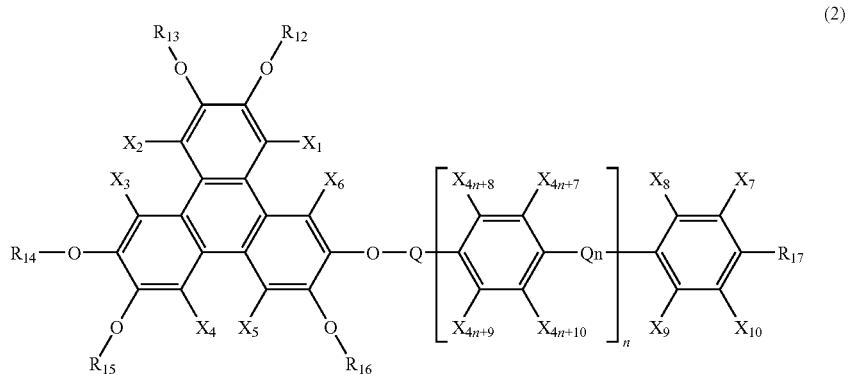

(2)

wherein $R_{12}$, $R_{13}$, $R_{14}$, $R_{15}$ and $R_{16}$ are identical or different and represent a hydrocarbon group having four or more carbon atoms, $R_{17}$ represents an alkyl group, alkoxy group or alkoxycarbonyl group having three or more carbon atoms, $X_1$, $X_2$, $X_3$, $X_4$, $X_5$, $X_6$, $X_7$, $X_8$, $X_9$, $X_{10}$, $X_{4n+7}$, $X_{4n+8}$, $X_{4n+9}$ and $X_{4n+10}$ represent a hydrogen atom, fluorine atom or chlorine atom, n represents an integer of 1 or more, Q represents a divalent group having four or more carbon atoms with —C(=O), —O, —C(=O)—O or —O—C(=O) on one or both ends thereof, and Qn represents —C(=O)—O— or —O—C(=O)—.

5. A display apparatus comprising: a liquid crystal device which comprises a liquid crystal alignment film, wherein the liquid crystal alignment film composition comprises one type of triphenylene compound (I) represented by the following general formula (1):

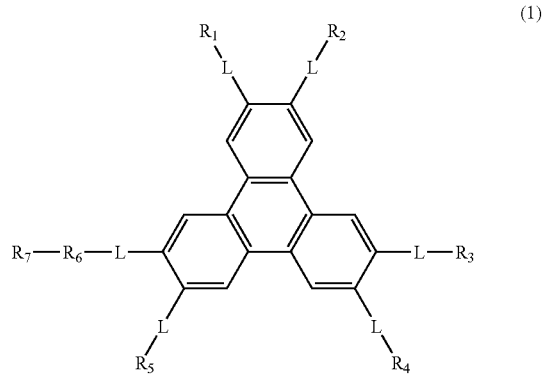

(1)

wherein L represents —O— or —S—, $R_1$, $R_2$, $R_3$, $R_4$ and $R_5$ are identical or different and represent a hydrocarbon group having four or more carbon atoms, $R_6$ represents a divalent hydrocarbon group having four or more carbon atoms, $R_7$ represents —$SiR_8R_9R_{10}$ or —$P(=O)(OH)_2$, and $R_8$, $R_9$ and $R_{10}$ are identical or different and represent —Cl, —OH, —$OCH_3$ or —$OC_2H_5$).

* * * * *